United States Patent
Alpert et al.

(10) Patent No.: US 11,894,884 B2
(45) Date of Patent: Feb. 6, 2024

(54) MODULAR ELECTRICAL GRID COMMUNICATIONS PLATFORM

(71) Applicant: Alarm.com Incorporated, Tysons, VA (US)

(72) Inventors: Charles Richard Alpert, Snoqualmie, WA (US); Roy Franklin Perry, Niwot, CO (US)

(73) Assignee: Alarm.com Incorporated, Tysons, VA (US)

(*) Notice: Subject to any disclaimer, the term of this patent is extended or adjusted under 35 U.S.C. 154(b) by 694 days.

(21) Appl. No.: 17/033,003

(22) Filed: Sep. 25, 2020

(65) Prior Publication Data

US 2021/0091822 A1  Mar. 25, 2021

Related U.S. Application Data

(60) Provisional application No. 62/905,496, filed on Sep. 25, 2019.

(51) Int. Cl.
| | |
|---|---|
| *H04B 1/16* | (2006.01) |
| *H04B 3/54* | (2006.01) |
| *H01R 13/639* | (2006.01) |
| *H01R 13/73* | (2006.01) |
| *G06Q 50/06* | (2012.01) |
| *H04L 12/28* | (2006.01) |

(52) U.S. Cl.
CPC .......... *H04B 3/546* (2013.01); *G06Q 50/06* (2013.01); *H01R 13/6395* (2013.01); *H01R 13/73* (2013.01); *H04L 12/2803* (2013.01); *H04L 2012/2841* (2013.01); *H04L 2012/2843* (2013.01)

(58) Field of Classification Search
CPC .... H04B 3/546; G06Q 50/06; H01R 13/6395; H01R 13/73; H04L 12/2803; H04L 2012/2841; H04L 2012/2843
USPC ...................................................... 375/257
See application file for complete search history.

(56) References Cited

U.S. PATENT DOCUMENTS

| | | | |
|---|---|---|---|
| 7,781,462 B2 | 8/2010 | Demko et al. | |
| 8,235,755 B2 | 8/2012 | Binder | |
| 8,591,264 B2 | 11/2013 | Binder | |
| 2013/0260613 A1* | 10/2013 | Misener | F21V 21/002 439/653 |
| 2015/0038006 A1* | 2/2015 | Jansen | H01R 25/006 439/535 |

(Continued)

*Primary Examiner* — Tanmay K Shah
(74) *Attorney, Agent, or Firm* — Fish & Richardson P.C.

(57) ABSTRACT

Methods, systems, and apparatus, including computer programs encoded on computer-storage media, for modular electrical grid communications platform. In some implementations, a devices includes a housing that forms an interior space, and that includes an exterior surface, one or more pass-through regions that each define a through-hole between the interior space and the exterior surface, and a recess at the exterior surface that is capable of receiving a module. The device includes a printed circuit board disposed within the interior space of the housing. The devices includes a module that has at least one sensor and that is placed in the recess. The device includes electrical connections that each have a first end connected to the printed circuit board, and a second end that directly or indirectly contacts a corresponding component of the module.

19 Claims, 7 Drawing Sheets

(56) References Cited

U.S. PATENT DOCUMENTS

2016/0363915 A1* 12/2016 Warren .................. G05B 15/02
2017/0084156 A1* 3/2017 Myllymäki ........ G05B 19/0428
2018/0034220 A1* 2/2018 Forti ..................... H01R 24/76

* cited by examiner

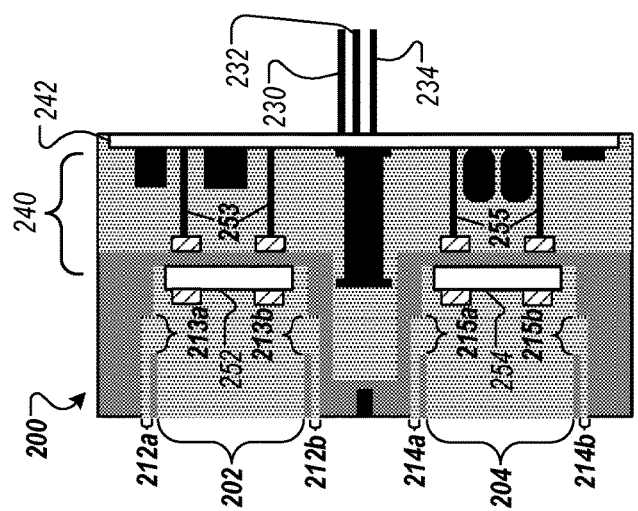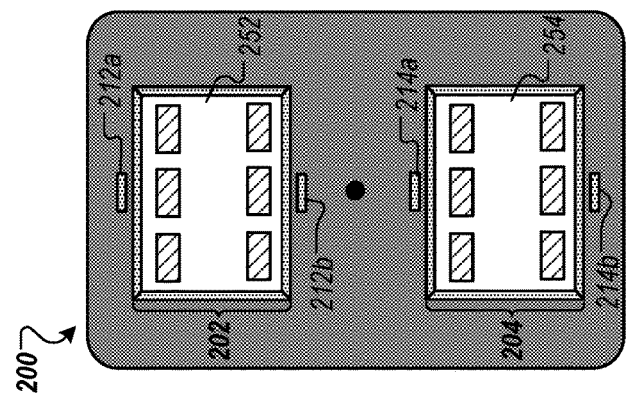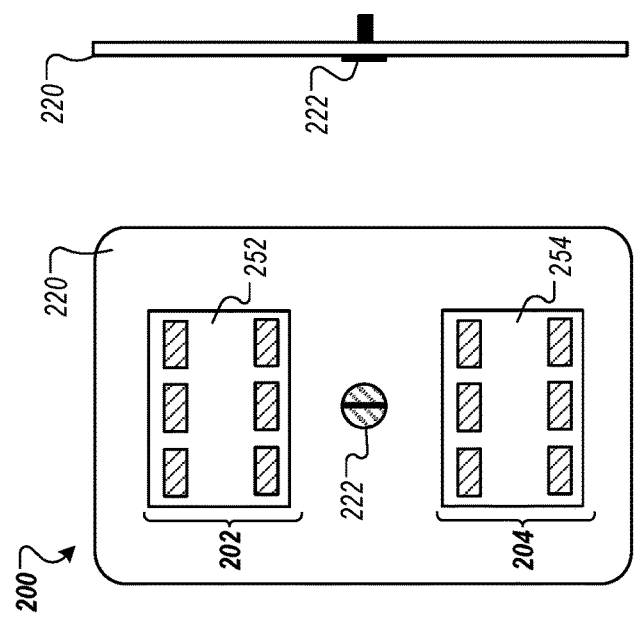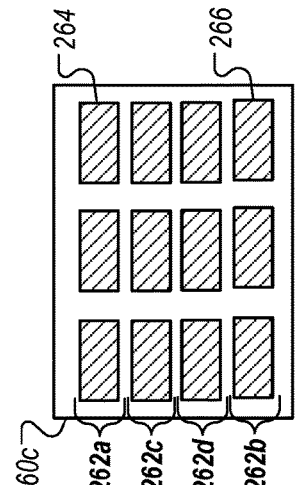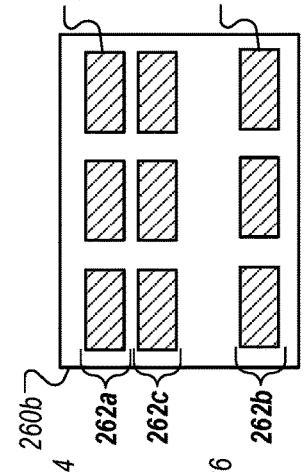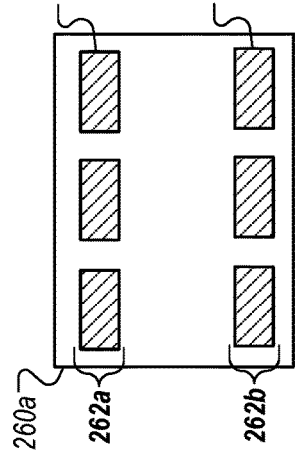

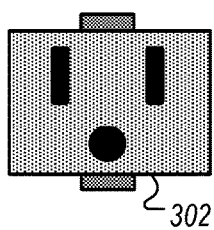
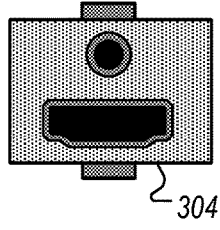
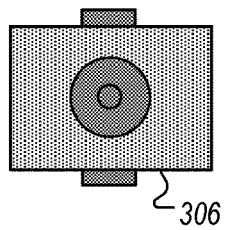
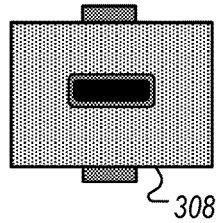
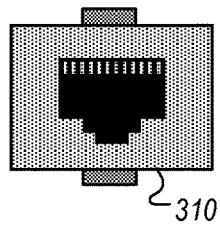
FIG. 3A
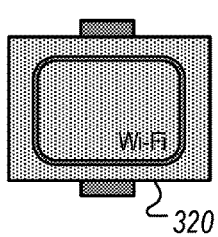
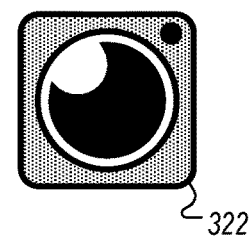
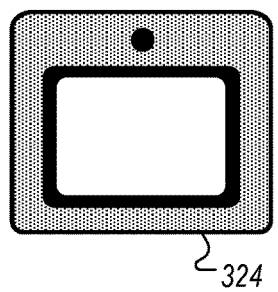
FIG. 3B
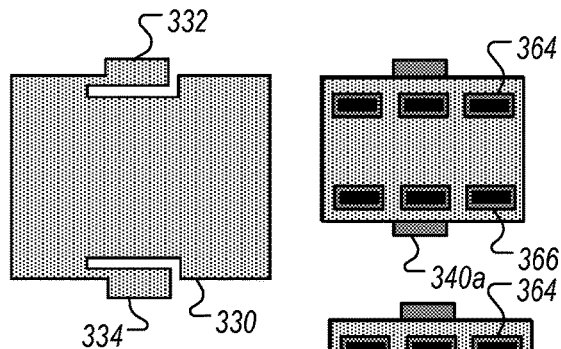
FIG. 3C
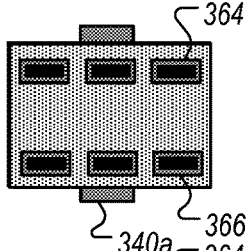
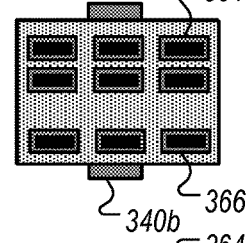
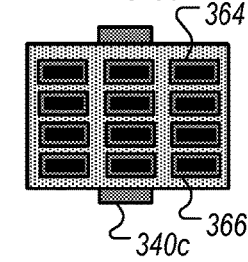
FIG. 3D

500

```
┌─────────────────────────────────────────────────────────┐
│  OBTAIN SENSOR DATA FROM ONE OR MORE SENSORS            │
│             LOCATED AT A PROPERTY                        │
│                                                    502   │
└─────────────────────────────────────────────────────────┘
                           │
                           ▼
┌─────────────────────────────────────────────────────────┐
│ WHERE THE SENSOR DATA INCLUDES DATA FROM A FIRST        │
│ MODULE INSERTED IN A MODULAR CELL INSTALLED ON THE      │
│                     PROPERTY                             │
│                                                    504   │
└─────────────────────────────────────────────────────────┘
                           │
                           ▼
┌─────────────────────────────────────────────────────────┐
│               ANALYZE THE SENSOR DATA                    │
│                                                    506   │
└─────────────────────────────────────────────────────────┘
                           │
                           ▼
┌─────────────────────────────────────────────────────────┐
│  BASED ON ANALYZING THE SENSOR DATA, DETERMINE ONE      │
│              OR MORE OPERATIONS                          │
│                                                    508   │
└─────────────────────────────────────────────────────────┘
                           │
                           ▼
┌─────────────────────────────────────────────────────────┐
│ SEND INSTRUCTIONS TO A MODULE INSERTED IN A MODULAR     │
│ CELL INSTALLED ON THE PROPERTY TO PERFORM AN            │
│ OPERATION OF THE ONE OR MORE OPERATIONS                 │
│                                                    510   │
└─────────────────────────────────────────────────────────┘
```

FIG. 5 mUS 11,894,884 B2

MODULAR ELECTRICAL GRID COMMUNICATIONS PLATFORM

CROSS-REFERENCE TO RELATED APPLICATION

This application claims the benefit of U.S. Provisional Application No. 62/905,496, filed Sep. 25, 2019, and titled "MODULAR ELECTRICAL GRID COMMUNICATIONS PLATFORM," which is incorporated by reference in its entirety.

TECHNICAL FIELD

The present specification relates to electrical grid communications and security systems.

BACKGROUND

Power-line communication (PLC) carries data on a conductor that is also used simultaneously for alternating current (AC) electric power transmission or electric power distribution to consumers. PLC can take advantage of the existing electrical wiring of a property without the need for additional wiring.

SUMMARY

In some implementations, a security system of a property integrates with the existing electrical wiring in the house. The security system may include a control unit connected to a local network of the property. One or more modular cells may be installed in the property in place of one or more wall outlets and/or light switches. The modular cells can receive various modules that provide an assortment of functionality. The various modules may include Wi-Fi access points, USB ports, Ethernet ports, standard outlet plugs, HDMI ports, infrared-light ports, and/or COAX connectors. The various modules may include security system sensors and/or equipment, such as a visible-light camera, an infrared-light camera, a thermostat or temperature sensor, a motion sensor, a light such as an LED light, a speaker, a microphone, a strobe, or a Bluetooth transmitter and/or receiver.

In some implementations, a set of modules are inserted into the modular cells. The modules within the set of modules can communicate with one another and/or can communicate with the control unit. The inserted modules may communicate with one another through the electrical wiring of the property. The inserted modules may communicate with one another through the local network. The inserted modules may communicate with one another through a combination of the electrical wiring and the local network. The inserted modules may communicate with the control unit through the electrical wiring of the property. The inserted modules may communicate with the control unit through the local network. The inserted modules may communicate with the control unit through a combination of the electrical wiring and the local network.

In some implementations, the security system includes equipment and sensors, and the control unit communicates with the some or all of the sensors and the pieces of equipment. This equipment and sensors may include inserted modules. Based on data received from one or more of the sensors and/or one or more pieces of the equipment, the control unit may determine one or more operations and may send instructions to one or more modules to perform the one or more operations. The control unit may detect, based on the data received from the one or more of the sensors and/or the one or more pieces of equipment, the occurrence of an event, and the one or more operations may be operations that are to be performed when the event is detected.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2A-2D are example diagrams of a modular cell or parts of the modular cell.

FIGS. 2E-2G show multiple example modular slot configurations.

FIGS. 3A-3D are example diagrams of insertable modules.

FIG. 5 is a flow diagram illustrating an example process for integrating a modular electrical grid communications platform with a security system.

Like reference numbers and designations in the various drawings indicate like elements.

DETAILED DESCRIPTION

A security system of a property may be integrated with a modular electrical grid communications platform. The resulting system may enable reliable, self-manageable premises internet of things (IoT) infrastructure for life safety and other critical IoT applications and services. By replacing one or more wall outlets, light switches, and/or smoke detectors of a property with modular cells in which a variety of modules that leverage PLC can be inserted, the system can leverage the benefits of PLC and increase the aesthetic appeal of the property by reducing the amount of external wires and the number of "wall warts" (e.g., AC/DC adapters, smart plugs, etc.) around the property. By implementing modular cells with interchangeable modules, the system offers a solution that is both embedded and still user configurable. Moreover, by implementing modular cells with interchangeable modules, the system enables users to easily and efficiently add, move, and/or replace modules throughout the property to perform various functions without the need for professional installation.

Figure 1:
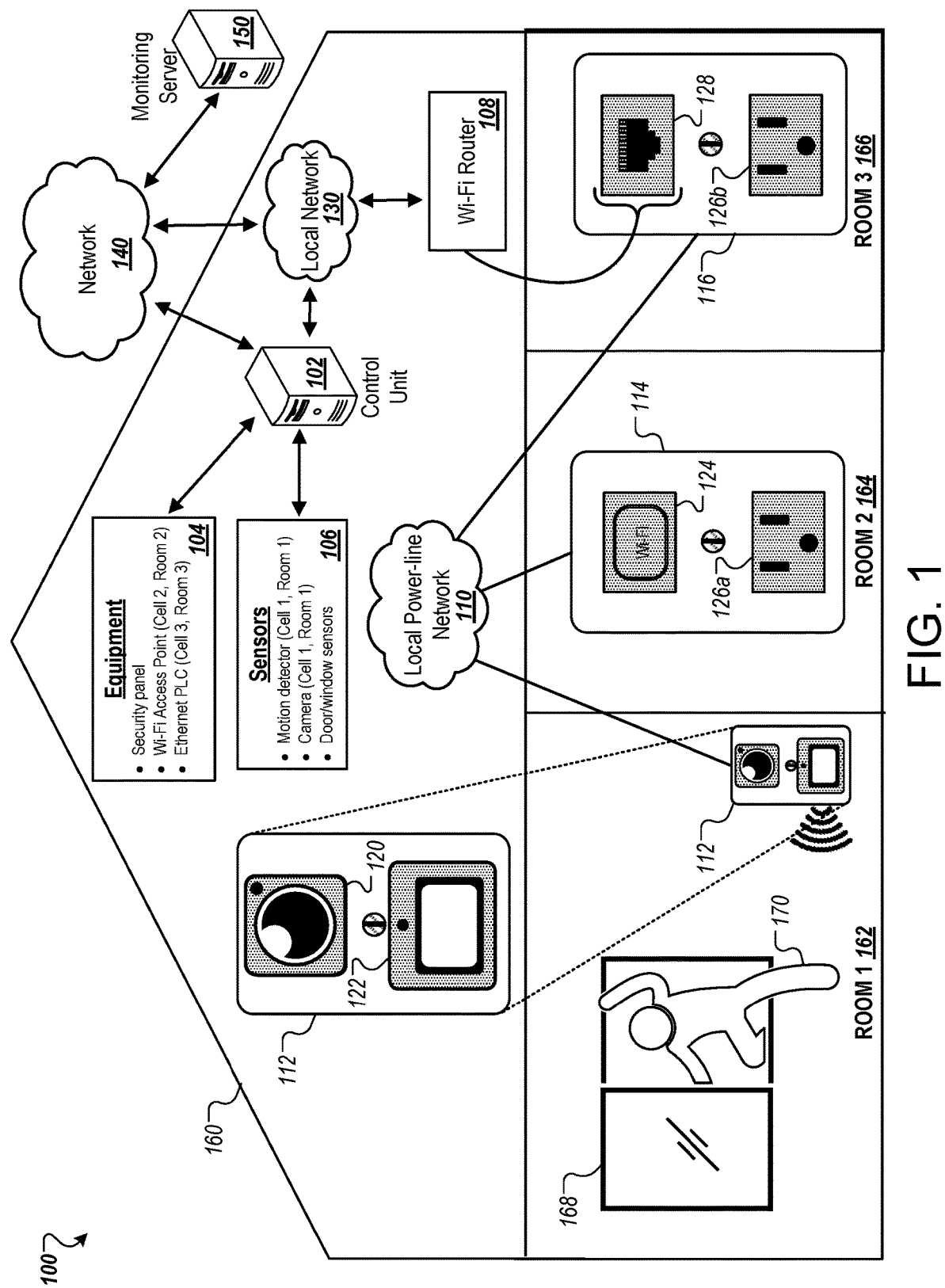
FIG. 1 is a diagram showing an example of a system for a modular electrical grid communications platform.

FIG. 1 is a diagram showing an example of a security system 100 integrated with a modular electrical grid communications platform. The modular electrical grid communications platform for a property 160 includes a number of wall-mounted modular cells in which a variety of modules can be inserted. The inserted modules can communicate with one another through PLC. The modules may include a multitude of interface ports, security equipment, and/or security sensors. The security system 100 can obtain data from these modules through PLC and/or through a local network 130. The security system 100 can leverage data obtained from these modules and from other equipment and sensors to detect an event. Based on the event, the security system 100 can determine one or more actions to perform. The security system 100 may send instructions to the modules or other equipment and sensors to perform the one or more actions.

The control unit 102 may include one or more computing devices. The control unit 102 may communicate with equipment 104 and sensors 106 through a wired and/or wireless connection. In implementations where the control unit 102 communicates with equipment 104 and sensors 106 through a wireless connection, the communication may take place over the local network 130. The control unit 102 may receive equipment and sensor output information from the equipment 104 and the sensors 106, respectively. The control unit 102 may communicate with the monitoring server 150 over the network 140. The control unit 102 may communicate with a device of an occupant of the property 160 over the local network 130 and/or over the network 140.

The sensors 106 may include, for example, one or more visible-light cameras, infrared-light cameras (IR cameras), magnetic sensors (e.g., that are installed on one or more doors and/or windows), motion detectors, temperature sensors, and/or water sensors. The sensors 106 may include modules that are inserted into wall-mounted modular cells. These modules can communicate with one another through a local power-line network 110. These modules can communicate with the control unit 102 through the local power-line network 110 and/or the local network 130.

The equipment 104 may include, for example, one or more security panels, Wi-Fi access points, communication ports (e.g., Ethernet, HDMI, USB-C, etc.), communication ports having PLC capabilities (e.g., Ethernet port with PLC capabilities), sump pumps, smart water valves, smart plugs, thermostats, smart HVAC system, smoke detectors, CO detectors, energy meters, smart locks, or garage door controllers. One or more pieces of equipment of the equipment 104 may integrate or utilize one or more sensors of the sensors 106. The equipment 104 may include modules that are inserted into wall-mounted modular cells. These modules can communicate with one another through a local power-line network 110. These modules can communicate with the control unit 102 through the local power-line network 110 and/or the local network 130.

The monitoring server 150 may include one or more computing devices. The monitoring server 150 may also include one or more data storage devices. The monitoring server 150 may communicate with a device of an occupant of the property 160 over the network 140 or over a cellular network.

The local power-line network 110 connects the modular cells through the electrical wiring of the property 160, allowing one or more of the inserted modules to communicate with one another and/or with the control unit 102 through the local network 130. The local power-line network 110 may use a communications standard (e.g., HPAV, HPAV2, G.hn, etc.).

The local network 130 can include public and/or private networks. The local network 130 may be a local area network (LAN).

The network 140 can include public and/or private networks and can include the Internet.

The disclosed techniques can improve multi-functionality and adaptability of a property. Properties are typically limited by the types of wall mounts (e.g., wall outlets, light switches, etc.) installed during construction. Adding new wall mounts or modifying existing wall mounts can require significant time and cost due to, for example, needing to run additional wire(s). The modular cells can replace existing wall mounts such as wall outlets and light switches and, by using PLC, do not require the running of additional wires. In addition, a consumer can quickly and easily change the function of a wall outlet by inserting a new module without the need for a licensed electrician to insert the module. The numerous insertable modules can perform variety of functions. The modules can be quickly inserted and switched out as needed to suit the property, part of the property, and/or the needs of a property owner or occupant over time. Accordingly, the insertable modules and modular cells improve the multi-functionality and adaptability of the property. The modular cells with insertable modules also provide improved functionality over, for example, smart plugs as they are less prone to being knocked out.

The disclosed techniques can greatly increase the aesthetics of a property. The modular cells with insertable modules greatly increases the aesthetic appeal of the property by reducing the amount of external wires and the number of "wall warts" (e.g., AC/DC adapters, smart plugs, etc.) in the property. Accordingly, the use of modular cells with insertable modules in the property produces a less cluttered aesthetic.

Moreover, the disclosed techniques can be used to improve functionality within a property or provide increased functionality. For example, the inserted modules can be used for media extension, for security or automation, can be used as Z-Wave and/or Zigbee repeaters (e.g., thereby eliminating need for lamp modules in PLC starter kits), can be used for charging, can be used to replace the functionality of a Wi-Fi radio and power supply, can be used for whole home DC powering schemes, can be used to provide Internet access throughout the property, can be used to eliminate the need for Wi-Fi at a property, can be used to provide multiple WAN connectivity options (e.g., cable modem, cellular, 5G), etc.

In FIG. 1, the security system 100 for the property 160 includes the control unit 102, the equipment 104, the sensors 106, and the monitoring server 150. The equipment 104 and the sensors 106 include a number of modules inserted into wall-mounted modular cells installed in the property 160. Specifically, the sensors 106 include a motion detector module 122 inserted into a first modular cell 112 that is installed in a first room 162 of the property 160, a camera module 120 inserted into the first modular cell 112, and a number of door and window magnetic sensors installed throughout the property 160. The equipment 104 includes a security panel, a Wi-Fi access point module 124 inserted into a second modular cell 114 installed in a second room 164 of the property 160, and an Ethernet module 128 with PLC capabilities inserted into a third modular cell 116 installed in a third room 166 of the property 160.

As shown in FIG. 1, the second modular cell 114 also has a power module 126a inserted. The power module 126a may be a NEMA 5-15R receptacle that allows for a standard power plug to be inserted. Similarly, the third modular cell 116 also has a power module 126b inserted. The power module 126b may also be a NEMA 5-15R receptacle that allows for a standard power plug to be inserted.

The first modular cell 112, the second modular cell 114, and the third modular cell 116 are all connected to the local power-line network 110 which uses the electrical wiring of the property 160. Through the local power-line network 110, one or more of the modules inserted in the modular cells 112, 114, and 116 can communicate with one another.

A router 108 is used to generate the local network 130. The router 108 is connected to the Ethernet module 128 of the third modular cell 116, thereby enabling communication between the local power-line network 110 and the local network 130. This connection between the router 108 and the Ethernet module 128 allows one or more of the modules inserted into the modular cells 112, 114, and 116 to communicate with the control unit 102 (e.g., through the local network 130), with the monitoring server 150 (e.g., through the local network 130 and the network 140), and with an occupant device (not shown) (e.g., through the local network 130 and/or the network 140). The router 108 may be a Wi-Fi router.

The Ethernet module 128 may include power over Ethernet (PoE). As such, the router 108 can be power cycled remotely when a corresponding instruction is sent to the Ethernet module of the third modular cell 116.

As will be discussed in more detail below with respect to FIG. 3, some modules may be smart modules that include active components. As an example, a smart module is a module that provides more than a simple physical connection. As shown, the camera module 120, the motion detector module 122, and the Wi-Fi access point module 124 are smart modules. The Ethernet module 128 may be a smart module, e.g. where the Ethernet module 128 includes PoE.

As will be discussed in more detail below with respect to FIG. 3, some modules may not be smart modules. As an example, the power modules 126a and 126b are not smart modules. However, the security system 100 may be able to turn off the power outputted through the power modules 126a and 126b. As such, the security system 100 may be able to power cycle devices receiving power through the power modules 126a and/or 126b.

As will be discussed in more detail below with respect to FIG. 3, some modules, including some smart modules, may not use PLC. These modules may, for example, communicate with other modules and/or with the control unit 102 directly through the local network 130 or through a different network (e.g., a cellular network).

The particular locations of the modular cells 112, 114, and 116 in the property 160 may be known and stored by the security system 100. For example, the particular locations of the modular cells 112, 114, and 116 in the property 160 may be known and stored by the control unit 102. As another example, the particular locations of the modular cells 112, 114, and 116 in the property 160 may be known and stored by the monitoring server 150. In this example, the control unit 102 may request modular cell location information when, for example, it detects an event (e.g., someone breaking in) based on received sensor information from the sensors 106 and/or equipment information from the equipment 104. In this example, the control unit 102 may determine if an event has occurred based on the received sensor information and/or equipment information. Alternatively, the control unit 102 may output sensor information from the sensors 106 and/or equipment information from the equipment 104 to the monitoring server 150, which, in turn, determines if an event has occurred based on the received sensor information and/or equipment information. As another example, the particular locations of the modular cells 112, 114, and 116 in the property 160 may be known and stored by the control unit 102 and the monitoring server 150.

In general, anything done by one component of the security system 100—for example anything done by the sensors 106, the inserted modules 120, 122, 124, 126a, 126b, and 128, equipment 104, the control unit 102, or the monitoring server 150—can be done by any other component. For example, event detection may occur at an individual modular cell, at the control unit 102, and/or at the monitoring server 150.

In some implementations, the control unit 102 and/or monitoring server 150 learn the location of the modular cells 112, 114, and/or 116 based on input received from an occupant of the property 160. The occupant may be able to input the modular cell locations through an occupant device, such as a computer, a cell phone, a smart phone, a tablet, or another computing device. The occupant may be able to input the modular cell locations by selecting a location on a floor plan generated for the property 160. The occupant may provide input that the first modular cell 112 is located in a first room 162 of the property 160, input that the second modular cell 114 is located in a second room 164 of the property 160, and/or input that the third modular cell 116 is located in a third room 166 of the property 160.

In some implementations, the control unit 102 and/or monitoring server 150 learn the location of the modular cells 112, 114, and/or 116 based on input received from a client technician. The technician may be able to input the modular cell locations through a client device, such as a computer, a cell phone, a smart phone, a tablet, or another computing device. The technician may install the modular cells 112, 114, and 116 in the property 160 and may input the locations of the modular cells 112, 114, and 116 during or after installation. The technician may be able to input the modular cell locations by selecting a location on a floor plan generated for the property 160. The technician may provide input that the first modular cell 112 is located in a first room 162 of the property 160, input that the second modular cell 114 is located in a second room 164 of the property 160, and/or input that the third modular cell 116 is located in a third room 166 of the property 160.

The security system 100 may determine the locations of one or more of the modules 120, 122, 124, 126a, 126b, and 128 based on the modular cells 112, 114, and 116 in which the modules are respectively inserted. For example, the control unit 102 may receive data from the camera module 120. This data may indicate that the data is being received from the first modular cell 112. The control unit 102 may look up a location of the first modular cell 112 in order to determine that the camera module 120 is located in the first room 162 of the property 160.

As shown in FIG. 1, a person 170 is breaking into the property 160 through a window 168. The motion detector module 122 inserted in the first modular cell 112 detects the movement of the person 170 as he enters the first room 162 of the property 160 and generates a corresponding signal to be transmitted to the control unit 102 (or, in some implementations, the monitoring server 150). The signal may be transmitted through the local power-line network 110 and may indicate that movement has been detected. The signal may be received at the Ethernet module 128 and outputted to the router 108. The router 108 may receive the signal and output the signal to the control unit 102 over the local network 130. The signal may undergo various modification throughout its transmission from the first modular cell 112 to the control unit 102.

In response to receiving the signal from the motion detector module 122, the control unit 102 (or, in some implementations, the monitoring server 150) may perform one or more actions. These one or more actions may depend on, for example, the location of the detection, the time of day, the time of year, and/or the arming state of the security system 100.

The control unit 102 (or, in some implementations, the monitoring server 150) may determine whether the detected movement is suspicious and/or assign a level of suspicion to the detected movement. The control unit 102 may perform one or more actions based on whether the detected movement is determined to be suspicious and/or on the assigned level of suspicion.

For example, the control unit 102 (or, in some implementations, the monitoring server 150) may determine that the detected movement is somewhat suspicious based on: the time of day of detection corresponding with a time that the occupants are usually not at the property 160; the time of year of detection corresponding with a time that the occupants are usually not at the property 160 (e.g., where the property 160 is a summer the property 160 and detection occurs in the winter); the location of the detected motion (the first room 162) being an area of the property 160 where occupants rarely visit; the location of the detected motion (the first room 162) being an area where occupants rarely visit at that time of the day; and/or the location of the motion (the first room 162) being an area where occupants rarely visit during that time of the year.

In response to determining that the detected movement is somewhat suspicious, the control unit 102 (or, in some implementations, the monitoring server 150) may send instructions to the camera module 120 to start recording and to transmit camera data back to the control unit 102. The control unit may also send a notification to one or more occupants of the property 160 that suspicious movement has been detected. The control unit 102 may ask the one or more occupants if they would like to view camera feed from the camera module 120 and/or from other cameras installed in the property 160. The control unit 102 may request input from the one or more occupants as to what further action if any should be taken (e.g., contact a security representative, contact the police as an emergency, contact the police as a non-emergency, etc.).

As another example, the control unit 102 (or, in some implementations, the monitoring server 150) may determine that the detected movement is moderately suspicious based on: no feedback being received from the one or more occupants after security system 100 has requested feedback from the one or more occupants; the security system 100 being armed when the movement is detected; the time of day of detection corresponding with a time that the occupants are usually asleep; the time of day of detection corresponding with a time when break-ins usually occur (e.g., between 6:00 am and 6:00 pm, between 10:00 am and 3:00 pm, the time that the occupants are typically at work, etc.); and/or the time of year of detection corresponding with a time that the occupants are usually not at the property 160 (e.g., where the property 160 is a summer the property 160 and detection occurs in the winter) and the time of day of detection corresponding with a time when break-ins usually occur.

The control unit 102 (or, in some implementations, the monitoring server 150) may also determine that the detected movement is moderately suspicious based on: the location of the detected motion (the first room 162) being an area of the property 160 where occupants rarely visit and the time of day of detection corresponding with a time when break-ins usually occur; the location of the detected motion (the first room 162) being an area where occupants rarely visit at that time of the day and the time of day of detection corresponding with a time when break-ins usually occur; the location of the motion (the first room 162) being an area where occupants rarely visit during that time of the year and the time of day of detection corresponding with a time when break-ins usually occur; the location of the detected motion (the first room 162) being an area of the property 160 where occupants rarely visit and the time of day of detection corresponding with a time when the occupants are usually not at the property 160 or are asleep; the location of the detected motion (the first room 162) being an area where occupants rarely visit at that time of the day and the time of day of detection corresponding with a time when the occupants are usually not at the property 160 or are asleep; and/or the location of the motion (the first room 162) being an area where occupants rarely visit during that time of the year the time of day of detection corresponding with a time when the occupants are usually not at the property 160 or are asleep.

In response to determining that the detected movement is moderately suspicious, the control unit 102 (or, in some implementations, the monitoring server 150) may send instructions to the camera module 120 to start recording and to transmit camera data back to the control unit 102. The control unit 102 may provide the received camera data from the camera module 120 and/or other cameras of the property 160 to the monitoring server 150 for remote storage and for review by a client representative. The control unit 102 may also send a notification to one or more occupants of the property 160 that suspicious movement has been detected. The control unit 102 may send a notification to the monitoring server 150 and/or a client representative that suspicious movement has been detected. The control unit 102 may provide camera feed from the camera module 120 and/or from other cameras installed in the property 160 to the one or more occupants, e.g., through one or more occupant devices. The control unit 102 may call the one or more occupants of the property 160 and/or connect them by phone to a client representative. The control unit 102 may request input from the one or more occupants as to what further action if any should be taken (e.g., contact the police as an emergency, contact the police as a non-emergency, etc.). The control unit 102 may sound an audible alarm system for the property 160. The control unit 102 may send instructions to one or more smart locks in order to prevent the person 170 from reaching the one or more occupants and/or getting further access to the property 160. For example, the security system 100 may contain a smart lock on a door between the first room 162 and the second room 164, and the control unit 102 may automatically lock this smart lock to prevent the person 170 from reaching the occupants and/or getting further access to the property 160.

As another example, the control unit 102 (or, in some implementations, the monitoring server 150) may determine that the detected movement is highly suspicious based on: feedback from one or more occupants to contact the police; feedback from a representative that the police should be contacted; the security system 100 being armed and the time of day of detection corresponding with a time that the occupants are usually asleep; and/or the security system 100 being armed and the time of day of detection corresponding with a time that the occupants are usually not at the property 160.

The control unit 102 (or, in some implementations, the monitoring server 150) may also determine that the detected movement is highly suspicious based on: the security system 100 being armed and the time of year of detection corresponding with a time that the occupants are usually not at the property 160; the security system 100 being armed and the location of the detected motion (the first room 162) being an area of the property 160 where occupants rarely visit; the security system 100 being armed and the location of the detected motion (the first room 162) being an area where occupants rarely visit at that time of the day; and/or the security system 100 being armed and the location of the motion (the first room 162) being an area where occupants rarely visit during that time of the year.

In response to determining that the detected movement is highly suspicious, the control unit 102 (or, in some implementations, the monitoring server 150) may send instructions to the camera module 120 to start recording and to transmit camera data back to the control unit 102. The control unit 102 may provide the received camera data from the camera module 120 and/or other cameras of the property 160 to the monitoring server 150 for remote storage and for review by a client representative. The control unit 102 may also send a notification to one or more occupants of the property 160 that highly suspicious movement has been detected. The control unit 102 may send a notification to the monitoring server 150 and/or a client representative that highly suspicious movement has been detected. The control unit 102 may automatically call the police. The control unit 102 may provide camera feed from the camera module 120 and/or from other cameras installed in the property 160 to the one or more occupants, e.g., through one or more occupant devices. The control unit 102 may call the one or more occupants of the property 160 and/or connect them by phone to a client representative and/or to the police. The control unit 102 may sound an audible alarm system for the property 160. The control unit 102 may send instructions to one or more smart locks in order to prevent the person 170 from reaching the one or more occupants and/or getting further access to the property 160. For example, the security system may contain a smart lock on a door between the first room 162 and the second room 164, and the control unit 102 may automatically lock this smart lock to prevent the person 170 from reaching the occupants and/or getting further access to the property 160. The control unit 102 may send instructions to one or more smart lights in the property 160 (e.g., LED light modules that are inserted into other modular cells) in order to light a path for the occupants of the property 160 to safely exit. The path chosen may be selected in order to keep the most distance between the occupants and the person 170.

In classifying the suspicion level of a particular event such as a movement, the control unit 102 or the monitoring server 150 may first calculate a score for the event. The score may be based on a number of factors. These factors may include, for example, the time of day of event detection, the time of year of event detection, an arming state of the property at the time of event detection, occupancy of the property at the time of event detection, a location of event detection, etc. The score may be affected by the degree a factor indicates suspicious activity. For example, the score may be increased if a factor strongly indicates suspicious activity. As another example, the score may be decreased or unaffected if a factor does not indicate suspicious activity. The score may be affected by the number of factors that indicate suspicious activity. For example, if a significant number of factors indicate suspicious activity, e.g. if more than 50% of the factors indicate suspicious activity, the score may be increased. As another example, if a majority of factors do not indicate suspicious activity, e.g. if 75% of the factors do not indicate suspicious activity, then the score may be decreased or unaffected.

The control unit 102 or the monitoring server 150 may compare the score to one or more thresholds in order to determine the suspicion level. For example, there may be a first threshold and a second threshold. If the score does not meet the first threshold, the control unit 102 or the monitoring server 150 may classify the suspicion level as somewhat suspicious. If the score meets the first threshold but does not meet the second threshold, the control unit 102 or the monitoring server 150 may classify the suspicion level as moderately suspicious. If the score meets the second threshold, the control unit 102 or the monitoring server 150 may classify the suspicion level as highly suspicious.

As another example, there may be a first threshold, a second threshold, and a third threshold. If the score does not meet the first threshold, the control unit 102 or the monitoring server 150 may classify the suspicion level as not suspicious. If the score meets the first threshold but does not meet the second threshold, the control unit 102 or the monitoring server 150 may classify the suspicion level as somewhat suspicious. If the score meets the second threshold but does not meet the third threshold, the control unit 102 or the monitoring server 150 may classify the suspicion level as moderately suspicious. If the score meets the third threshold, the control unit 102 or the monitoring server 150 may classify the suspicion level as highly suspicious.

The thresholds for determining a suspicion level may be preexisting. The thresholds may be stored, for example, on the monitoring server 150. The thresholds may be accessible to the control unit 102. The thresholds may change over time based on, for example, feedback from property owners or occupants. This feedback may indicate whether suspicious activity did in fact occur, e.g. a confirmation from a property owner that someone did try and break into the property.

In some implementations, modules are configured to detect signal transmitted by other modules and perform actions in response. In these implementations, other inserted modules, including modules inserted into different modular cells, may be able to detect signals generated by other modules and perform one or more actions in response. These signals may include wired signals, such as PLC signals through the power-line network 110, and/or wireless signals. For example, the camera module 120 may detect the signal transmitted by the motion detector module 122 over the local power-line network 110, and, in response, automatically start recording camera data and transmitting the camera data to the control unit 102. As another example, a different module, such as a light module, inserted into a different modular cell than the modular cell 112 may detect the motion detector module 122 signal over the local power-line network 110 and turn on a light in order to, for example, provide a path for occupants to exit the property 160 or to direct them to a safe part of the property 160, or to direct them to an area of the property that is far away from where the motion was detected. Modules may be able to send out a wireless signal, such as a Wi-Fi signal or a Bluetooth signal, which other inserted modules may detect and perform one or more actions in reaction to the detected signal. Modules may be configured to detect one or more signals from another module that it shares a modular cell with. Signal detection may occur through the circuitry of the modular cell that the two or more modules share, e.g. a PLC circuit as shown in FIG. 2D.

In these implementations, the detected signal may include an indication of the source of the signal. The detected signal may include an indication that a detection has occurred. The detected signal may also include an indication of a state of a source module. For example, an indication of the source of the signal may be an indication of the particular module from which the signal originated, e.g. the motion detector module 122. As another example, an indication of the signal may be an indication of the particular modular cell that transmitted the signal, e.g. the modular cell 112. As an example, the state of the source module, e.g. the motion detector module 122, may include an indication that the module is in an "on" state, an "off" state, or some other state.

In some implementations, an occupant can control one or more of the modules of the property 160 through an occupant device, such as a computer, a cell phone, a smart phone, a tablet, or another computing device. As an example, the occupant may be able to turn the Wi-Fi access point module 124 on or off. As another example, the occupant may be able to instruct the camera module 120 to start or end recording. An instruction from an occupant may be sent to the monitoring server 150 over the network 140 or through a cellular network. The monitoring server 150 may communicate the instruction to the control unit 102 through the network 140 or directly to the camera module 120 through the network 140 and the local network 130. An instruction from an occupant may be sent to the control unit 102 over the local network 130. An instruction from an occupant may alternatively be provided to the control unit 102 through the security panel of the security system 100 instead of through an occupant device.

In some implementations, the one or more inserted modules 120, 122, 124, 126a, 126b, and/or 128 can be used as an automation hub (e.g., Z-Wave, Zigbee, etc.) and with a security state machine, e.g. the control unit 102, to provide home security without a control panel.

In some implementations, the security system 100 may include a security panel module inserted into a modular cell installed on the property 160. In these implementations, the security system 100 may not need a separate security panel. The security panel module may include, for example, a touch screen. The security panel module may be used by occupants of the property 160 to control various functions of the security system 100. For example, the occupants of the property 160 may be able to set an alarm state through the security panel module.

FIGS. 2A-2D are example diagrams of a modular cell 200 or parts of the modular cell 200.

FIG. 2A shows a modular cell 200 having a wall plate 220 secured to the modular cell 200 with a screw 222. The modular cell 200 includes a first modular slot 202 having six pins in which a module can be inserted. The pins corresponding to the slot 202 are mounted in a first housing 252. The modular cell 200 also includes a second modular slot 204 having six pins in which a module can be inserted. The pins corresponding to the slot 204 are mounted in a second housing 252.

The modular cell 200 may replace a standard wall power outlet. The modular cell 200 may replace a standard light switch (or other switch). The modular cell 200 may also replace a smoke detector. As an example, where the modular cell 200 replaces a smoke detector, a smoke detector module may be inserted into the modular cell 200. Many property owners tend to ignore the fact that smoke detectors expire. However, the implementation of a quickly and easily replaceable smoke detector module may incentivize property owners to replace the smoke detector modules when they expires. Because the modular cells can replace numerous outlets, light switches, and smoke detectors (e.g., or other devices that are connected to the power lines of a property) throughout a property, e.g. the property 160 shown in FIG. 1, the inserted modules and their corresponding sensors and equipment can be strategically or exhaustively placed throughout the property. Accordingly, the security system 100 shown in FIG. 1 can use the inserted modules and their corresponding sensors and equipment to strategically or comprehensively monitor the property.

In some implementations, the modular cell 200 may be a different shape. For example, the modular cell 200 may be circular. For example, when the modular cell 200 replaces a smoke detector, the modular cell 200 may be circular in shape in order to meet the form factor of the smoke detector that it is replacing.

In some implementations, the modular cell 200 includes a different number of modular slots. For example, the modular cell 200 may include a single modular slot, three modular slots, four modular slots, etc.

Each of the modular slots 202 and 204 is configured to receive a module. As will be described in more detail with respect to FIG. 3, these modules can include Wi-Fi access points, Wi-Fi mesh nodes, Ethernet, cameras, motion detectors, etc. As shown, the modular slots 202 and 204 each include six pins. However, other configurations with more or less pins are possible. For example, the modular slots 202 and 204 may each have twelve pins, ten pins, eight pins, four pins, etc.

In some implementations, the modular slots of a modular cell have a different number of pins. As an example, a first modular slot of a particular modular cell may have six pins, and, therefore, would be compatible with, for example, a USB-A module, a Micro-B USB module, a Mini USB module, etc. In contrast, a second modular slot of the same modular cell may have twelve pins, and, therefore, be compatible with additional modules that require additional pins such as an Ethernet module, a USB 3.0 or 3.1 module, etc. The second modular slot may remain compatible with modules that require less pins. For example, the second modular slot with twelve pins may be capable of receiving a module having only six sockets or six functional sockets (e.g., in addition to one or more dummy sockets that can physically receive a pin but don't electrically couple the pin to any electrical components of the module). Alternatively, the module may use contact pads instead of sockets. For example, the second modular slot with twelve pins may be capable of receiving a module having up to twelve contact pads (e.g., copper surface in or coupled to a printed circuit board of the module that may be embedded in silicone of the printed circuit board and/or in a plastic housing of the module) that contact corresponding pins of the second modular slot. If the module has less than twelve contact pads, such as six contact pads, then the areas of the module that correspond to the six pins that will not be electrically coupled to any electrical components of the module may just be silicone (e.g., of a printed circuit board of the module) or plastic (e.g., of a housing of the module) so to prevent any electrical connection between the module and those six pins. Accordingly, the second modular slot may remain compatible with modules that do not require all twelve pins, such as a USB-A module, a Micro-B USB module, a Mini USB module, etc.

Different pin/socket/contact pad configurations are described in more detail below with respect to FIGS. 2E-2G.

The housings 252 and 254 may be made from a polymer, such as a plastic or silicone.

In some implementations, instead of pins, the modular cell 200 includes sockets that receive pins from corresponding modules. For example, the slot 202 may include six sockets that are mounted in the housing 252. These six sockets may receive six corresponding pins of a module, such as the camera module 120 shown in FIG. 1.

FIG. 2B shows a profile view of the wall plate 220 and the screw 222. The wall plate 220 and the screw 222 may be removed from the modular cell 200 in order to allow for the insertion or the removal of one or more modules from the modular slots 202 and 204. For example, the wall plate 220 may serve as a locking mechanism such that when the wall plate 220 is secured to the modular cell 200 with the screw 222, removal of modules inserted into the modular slots 202 and 204 may not be possible. This may be due to the openings in the wall plate 220 corresponding to the slots 202 and 204 being smaller than the actual openings of the slots 202 and 204. Additionally or alternatively, as described below, the wall plate 220 may serve as a locking mechanism with a structure that locks tabs of a module. For example, the wall plate 220 may prevent the insertion of a tool to remove a module from the slot 202.

In some cases, when the wall plate 220 is secured to the modular cell 200 with the screw 222, insertion of modules or particular types of modules into the modular slots 202 and 204 is possible. For example, there may be certain modules designed such that they can be inserted and removed without requiring the wall plate 220 to be removed. These modules may not have, for example, tabs for locking the modules in the one of the modular slots 202 and 204. For example, with respect to FIG. 3C, a module that can be inserted and removed from one of the modular slots 202 and 204 may not have tabs like the tabs 332 and 334 of the module 330.

FIG. 2C shows the modular cell 200 with the wall plate 220 and the screw 222 removed. The modular cell 200 includes a first opening 212a above the modular slot 202 and a second opening 212b below the modular slot 202. The first opening 212a and the second opening 212b may be used to remove a module that is inserted into the modular slot 202. Similarly, the modular cell 200 includes a third opening 214a above the modular slot 204 and a fourth opening 214b below the modular slot 204. The third opening 214a and the fourth opening 214b may be used to remove a module that is inserted into the modular slot 204. For example, a module may include two plastic tabs, one located on an upper surface of the module and one located on a lower surface of the module (e.g. the module 330 shown in FIG. 3C includes a first upper tab 332 and a second lower tab 334). These plastic tabs may serve as a locking mechanism. For example, if the module is inserted into the modular slot 202, that tabs of the module may lock the module in the slot 202, preventing a user from removing the module. To remove the module, the user may be able to insert an extraction tool into the openings 212a and 212b that presses down on the plastic tabs of the module. When the plastic tabs of the module are pushed down, the module is unlocked and can be removed from the modular slot 202 by, for example, the user pulling the module out.

As illustrated, the openings 212a and 212b and the openings 214a and 214b may be covered by the wall plate 220 when it is secured to the modular cell 200. Accordingly, in the example described above, if a module with tabs is inserted into the one of the slots 202 and 204, then the module may be locked in the corresponding modular slot until a user removes the wall plate 220 and inserts an extraction tool into the openings 212a and 212b or the openings 214a and 214b to remove the module.

In some cases, the wall plate 220 includes openings that can be used to unlock a module inserted into one of the modular slots 202 and 204. For example, the wall plate 220 may include openings that correspond to the openings 212a-212b and 214a-214b. These openings in the wall plate 220 may allow an extraction tool be inserted through the wall plate 220 and into either the openings 212a-212b or the openings 214a-214b to unlock a module in the slot 202 or the slot 204 respectively.

FIG. 2D shows a cutaway, profile view of the modular cell 200. As shown, the modular slots 202 and 204 are set into the modular cell 200 at approximately ⅓ to ⅔ the depth of the modular cell 200, allowing the modular slots 202 and 204 to receive the entirety or a substantial portion of any modules to be inserted. The modular cell 200 includes an upper cavity 213a and a lower cavity 213b that correspond with the modular slot 202. As an example, the upper cavity 213a is designed to receive a plastic tab located on an upper surface of a module, e.g. as shown in FIG. 3C, inserted into the modular slot 202. In this example, the lower cavity 213b is designed to receive a plastic tab located on a lower surface of a module, e.g. as shown in FIG. 3C, inserted into the modular slot 202. Similarly, the modular cell 200 includes an upper cavity 215a and a lower cavity 215b that correspond with the modular slot 204. As an example, the upper cavity 215a is designed to receive a plastic tab located on an upper surface of a module, e.g. as shown in FIG. 3C, inserted into the modular slot 204. In this example, the lower cavity 215b is designed to receive a plastic tab located on a lower surface of a module, e.g. as shown in FIG. 3C, inserted into the modular slot 204.

The modular cell 200 also includes a PLC backplane 242 and PLC components 240. The PLC components 240 may include, for example, one or more DC/DC converters (e.g. a DCDC1.5), one or more AC/DC converters, one or more line drivers, one or more transmitters, one or more receivers, one or more zero-crossing detectors, one or more chipsets, RAM (e.g. DDR3, DDR4, etc.), flash memory (e.g. FLASH 32 Mbit), and/or one or more relays. The PLC backplane 242 may be, for example, a G.hn, a HPAV, or a HPAV2 power-line board. The PLC backplane 242 may be a HomePlug power-line board.

The PLC backplane 242 is electrically connected to the pins (or, in some cases, sockets) of the modular slot 202 through wires 253. The wires 253 may have first ends that are connected to the housing 252 (and/or directly connected to the pins of the modular slot 202) and second ends that are connected to the PLC backplane 242. Data and/or power may be transferred over the wires 253 when a module is inserted into the modular slot 202. Similarly, the PLC backplane 242 is electrically connected to the pins (or, in some cases, sockets) of the modular slot 204 through wires 255. The wires 255 may have first ends that are connected to the housing 254 (and/or directly connected to the pins of the modular slot 204) and second ends that are connected to the PLC backplane 242. Data and/or power may be transferred over the wires 255 when a module is inserted into the modular slot 204.

The modular cell 200 is connected to the power wires 230-34 of a property (e.g., the property 160 as shown in FIG. 1). The wire 230 may be the "hot wire" and may provide 120 VAC. The wire 232 may be the "neutral wire" and may provide a return path for the current provided by the wire 230. The wire 232 may be connected to an earth ground. The wire 230 and the wire 232 may form a live circuit. The wire 234 may be the "ground wire" and may be connected to an earth ground.

The pins of the modular slots 202 and 204 may be spring loaded. The spring-loaded pins of the modular slot 202 or the modular slot 204 may need to be pressed at approximately the same time during the insertion of a module to engage movement and enable proper connection of the module to the PLC backplane 242 of the modular cell 200. This can improve safety, by for example, preventing or reducing the likelihood of power transfer if an object that is not a module is inserted into the modular slot 202 or the modular slot 204.

The pins of the modular slots 202 and 204 may be capable of contacting corresponding contact pads of a module when the pins are spring loaded.

In some cases, a circuit board of the modular cell 200 determines that a module has been inserted into one of the modular slots 202 and 204 if it detects that power is being drawn from the PLC backplane 242 to a corresponding modular slot. For example, the circuit board of the modular cell 200 (e.g., that includes the PLC backplane 242 and the PLC components 240) may detect that power is being drawn along one or more of the wires 253. Based on this, the circuit board of the modular cell 200 may determine that a module has been inserted into the modular cell 202. In response to this determination, the circuit board of the modular cell 200 may send a request for data along one or more of the wires 253. The requested data may be used by the circuit board of the modular cell 200 to identify the particular type of module that has been inserted. In some cases, once a module is inserted into a corresponding module slot of the modular slots 202 and 204, it sends data to the module cell 200. The circuit board (e.g., a processor or microprocessor onboard the circuit board) may use this data to identify the module that has been inserted.

The circuit board of the modular cell 200 may use the identity of the module to determine how to preprocess data received from the module before, e.g., transmitting the data along the local power-line network 110, and how to send data to the module. For example, once the circuit board has identified a module inserted into the modular slot 202 as a USB-A module, other than a dedicated power (e.g., VDC) pin and a dedicated ground pin, it may determine that a first pin of the modular slot 202 (and a corresponding wire of the wires 253) correspond to Data –, and a second pin of the modular slot (and a corresponding wire of the wires 253) correspond to Data +. The circuit board of the modular cell 200 may then use these pins to collect data from the USB-A module and send data to the USB-A module.

In some cases, the circuit board of the modular cell 200 uses the number of pins engaged by a module to, at least in part, identify the module. For example, the circuit board may detect that current is being drawn on four of the six pins of the modular slot 202 (e.g., four of the six wires of the wires 253). Based on this, the circuit board may determine that the module inserted is a USB-A module, or may identify a subset of modules that may have been inserted (e.g., USB-A module, camera module, motion detector module).

FIGS. 2E-2G show multiple modular slot configurations.

FIG. 2E shows a modular slot 260a having a six pin configuration. The modular slot 260a may have a first row of pins 262a having three pins, and a second row of pins 262b having three pins. The first row of pins 262a includes a pin 264. The pin 264 may be a dedicated power pin (e.g., VDC) that all modules that are compatible with the modular slot 260a may use to draw power, e.g., from the PLC backplane 242. The second row of pins 262b includes a pin 266. The pin 266 may be a dedicated ground pin that all modules that are compatible with the modular slot 260a may use for ground. The other pins may be used for various other functions, such as data transfer, high speed data transfer, communication functions, etc.

Various other configurations of pins may be possible, however. For example, a modular slot having six pins may have all six pins in a single row of pins.

As shown, the modular slot 260a may be capable of receiving a module with up to six sockets or contact pads. If a module includes six sockets, each of the sockets may receive a corresponding pin of the modular slot 260a when the module is inserted into the modular slot 260a. Similarly, if a module includes six contact pads, each of the contact pads may contact a corresponding pin (e.g., spring-loaded pin) of the modular slot 260a when the module is inserted into the modular slot 260a.

In some cases, instead of pins, the modular slot 260a includes sockets that receive corresponding pins of a module. For example, the modular slot 260a may include six sockets that are capable of receiving up to six pins of a module.

In some cases, instead of pins, the modular slot 260a includes contact pads that are contacted by spring-loaded pins of a module. For example, the modular slot 260a may include six contact pads that are capable of contacting (e.g., and, thereby, electrically coupling) up to six spring-loaded pins of a module.

FIG. 2F shows a modular slot 260b having a nine pin configuration. The modular slot 260b may have the first row of pins 262a having three pins, the second row of pins 262b having three pins, and a third row of pins 262c having three pins (e.g., although various other configurations are possible). Again, the first row of pins 262a includes the pin 264 that may be a dedicated power pin. The second row of pins 262b includes the pin 266 that may be a dedicated ground pin. The other pins, including those in the third row of pins 262c, may be used for various other functions, such as data transfer, high speed data transfer, communication functions, etc.

As shown, the modular slot 260b may be capable of receiving a module with up to nine sockets or contact pads. If a module includes nine sockets, each of the sockets may receive a corresponding pin of the modular slot 260b when the module is inserted into the modular slot 260b. Similarly, if a module includes nine contact pads, each of the contact pads may contact a corresponding pin (e.g., spring-loaded pin) of the modular slot 260b when the module is inserted into the modular slot 260b.

In some cases, instead of pins, the modular slot 260b includes sockets that receive corresponding pins of a module. For example, the modular slot 260b may include nine sockets that are capable of receiving up to nine pins of a module.

In some cases, instead of pins, the modular slot 260b includes contact pads that are contacted by spring-loaded pins of a module. For example, the modular slot 260b may include nine contact pads that are capable of contacting (e.g., and, thereby, electrically coupling) up to nine spring-loaded pins of a module.

FIG. 2G shows a modular slot 260b having a twelve pin configuration. The modular slot 260b may have the first row of pins 262a having three pins, the second row of pins 262b having three pins, the third row of pins 262c having three pins, and a fourth row of pins 262d having three pins (e.g., although various other configurations are possible). Again, the first row of pins 262a includes the pin 264 that may be a dedicated power pin. The second row of pins 262b includes the pin 266 that may be a dedicated ground pin. The other pins, including those in the third row of pins 262c and the fourth row of pins 262d, may be used for various other functions, such as data transfer, high speed data transfer, communication functions, etc.

As shown, the modular slot 260c may be capable of receiving a module with up to twelve sockets or contact pads. If a module includes twelve sockets, each of the sockets may receive a corresponding pin of the modular slot 260c when the module is inserted into the modular slot 260c. Similarly, if a module includes twelve contact pads, each of the contact pads may contact a corresponding pin (e.g., spring-loaded pin) of the modular slot 260*c* when the module is inserted into the modular slot 260*c*.

In some cases, instead of pins, the modular slot 260*c* includes sockets that receive corresponding pins of a module. For example, the modular slot 260*c* may include twelve sockets that are capable of receiving up to twelve pins of a module.

In some cases, instead of pins, the modular slot 260*c* includes contact pads that are contacted by spring-loaded pins of a module. For example, the modular slot 260*c* may include twelve contact pads that are capable of contacting (e.g., and, thereby, electrically coupling) up to twelve spring-loaded pins of a module.

In some cases, the modular cell 200 may include different modular slot configurations. For example, a modular slot may include a single row of pins/sockets/contact pads. Specifically, a modular slot may include the row of pins 262*a* without any other pins. As another example, a modular slot may include only one or two pins/sockets/contact pads.

As another example, a modular slot may include pins/sockets/contact pads that are arranged vertically instead of horizontally (e.g., such that the longer edge of each of the pins/sockets/contact pads is aligned vertically instead of horizontally).

As another example, a modular slot may include pins/sockets/contact pads that are arranged in patterns other than rows. For example, the pins/sockets/contact pads for a modular slot may be arranged diagonally. As another example, a modular slot may include one or more pins/sockets/contact pads in each corner of the modular slot.

FIGS. 3A-3D are example diagrams of insertable modules.

FIG. 3A depicts example modules with communication and power capabilities. The modules include various communication ports. Specifically, as shown, the modules include a power module 302, an HDMI module 304 having an infrared-light (IR) port for transmitting and receiving data, a COAX F-connector module 306, a USB Type-C module 308 with power delivery, and an Ethernet module 310.

The power module 302 when inserted into a modular cell can be power cycled. Accordingly, anything plugged into the power module 302 can be power cycled when the power module 302 is inserted into a modular cell. This can be used to, for example, automate lighting in all or a portion of a property without the need for smart light bulbs. For example, a light such as a lamp could be plugged into the power module 302 that is inserted into a modular cell. A user could then, e.g. through the control unit 102 shown in FIG. 1 or through a mobile device in communication with the control unit 102, could turn the light on and off by power cycling the power module 302.

Other modules may include a lighting module, e.g., having one or more light-emitting diodes. The lighting module may be a passive or an active component. As a passive component, the lighting module can be power cycled to turn the light on off in a manner described. As an active component, the lighting module can automatically turn on when it detects a signal from another module, e.g. a motion detector module. For example, the lighting module may automatically turn on when it detects a signal, e.g. through PLC, from a motion detector module indicating that motion has been detected. As an active component, the lighting module may include one or more sensors, e.g. a light sensor, and automatically turn on or off when certain conditions are detected. For example, the lighting module may automatically turn on when it detects that the light in the room is below a set threshold.

As an example, a user may use two or more modular cells, such as the modular cell 200 shown in FIGS. 2A and 2C-2D, installed in a property to extend signals throughout the property. In this example, a module inserted in one of the modular cells may serve as a transmission module and another module inserted into another modular cell may serve as a receiver module. The transmission module may translate a signal it receives into a PLC signal. The receiver module may translate the PLC signal back into the original signal, or approximately the original signal, that the transmission module received.

In this way, two or more modular cells each having a module inserted therein may be used for media extension. For example, two modular cells may each have an HDMI module 304 inserted therein. The two HDMI modules 304 can function together as an HDMI extender. That is, for example, the two HDMI modules 304 could be used together to extend cable TV from one room of the property to a different room of the property without the need for additional cable boxes. In this example, one of the HDMI modules 304 may serve as a receive unit and the other HDMI module 304 may serve as a transmit unit. The transmit unit is connected to a cable box and, with the cable box, serves as a transmitter of the cable TV signal. The transmit unit may transport the TV signal over the PLC network, where protocols such, as TCP/IP ride, that transport. The receive unit may receive the TV signal over the PLC network from the transmit unit. Similarly, two or more Bluetooth modules can function together as a Bluetooth extender. Similarly, two or more USB modules 308 can function together as a USB extender.

In some implementations, there may be multiple receiver modules that each receive a PLC signal from a single transmission module. In these implementations, there may be one transmission module connection point and multiple receiver module connection points. For example, there may be a single transmission HDMI module that is connected to a cable box, receives a TV signal, and transports the TV signal over a PLC network. In this example, there may be multiple receiver HDMI modules, each receiving the same TV signal, and providing the TV signal for display on a corresponding TV. Accordingly, the TV signal may be displayed on multiple TVs throughout various parts of a property without the need for multiple cable boxes.

The Ethernet module 310 may include PoE. The Ethernet module 310 may include a RJ45 or 8P8C connector. The Ethernet module 310 may be used, for example, to extend an internet connection throughout a property.

FIG. 3B depicts example smart or active modules. The smart or active modules may include various equipment and/or sensors that can be integrated with a security system of the property (e.g., the security system 100 as shown in FIG. 1). The modules include a Wi-Fi module 320, a camera module 322, and a motion detector module 324.

The Wi-Fi module 320 may be a Wi-Fi access point that utilizes PLC. The Wi-Fi module 320 may be a Wi-Fi mesh node that does not utilize PLC and instead relies on the local network of the property (e.g., the local network 130 as shown in FIG. 1) and, possibly, other Wi-Fi mesh nodes. The Wi-Fi module 320 may be used, for example, to extend Wi-Fi throughout a property. The Wi-Fi module 320 may be used, for example, for traffic and capacity management. For example, a user, through the control unit 102 shown in FIG. 1 or through a mobile device in communication with the control unit 102, may be able to turn off the Wi-Fi in the property by turning off the Wi-Fi module, may be able to set a time for the Wi-Fi module to turn off, may be able to limit or set the download speeds, may be able to limit or set the upload speeds, and/or may be able to prioritize the download or upload of certain data over others. The Wi-Fi module 320 may be used, for example, for cybersecurity. For example, a user, through the control unit 102 or through a mobile device in communication with the control unit 102, may be able to set or change a password that must be entered to connect to a property's Wi-Fi, and/or set or change a Wi-Fi encryption (e.g., WEP key, WPA key, WPA-3 key, etc.).

The camera module 322 may include a visible-light camera, an IR camera, or a light sensor. The camera module 322 may be able to communicate with a security system, e.g., the security system 100 as shown in FIG. 1, through PLC and/or through wireless capabilities (e.g., Wi-Fi, Bluetooth, Cellular, etc.).

There may be different types of camera modules that can provide different functionality and/or be used in different areas of a property due to privacy concerns. For example, there may be a lower quality camera, e.g. one having a lower resolution. This lower quality camera may be used, e.g. by the security system 100 shown in FIG. 1, for motion detection and/or gesture recognition without privacy concerns. Accordingly, such lower quality cameras may be used in more sensitive areas of a house such as bathrooms and bedrooms. A higher quality camera, e.g. one having a higher resolution may be used, e.g. by the security system 100, for facial recognition and/or object detection.

The camera module 322 can be used by the security system 100 shown in FIG. 1 to detect people within a property. The security system 100, or the module itself, may take one or more actions in response to the detection of a person within the property. For example, if the security system 100 determines that the occupants of a property are not at the property or are not expected to be at the property, the detection of a person using the camera module 322 may trigger an alarm, a notification being sent to the occupants of the property, a notification being sent to a monitoring service remote of the property, etc.

Using the camera module 322, the security system 100 may be able to identify a particular person or identify an estimated age of a person within the property and perform a particular action based on the detected person or the detected age of the person. For example, the camera module 322 may be used to detect senior wandering. In this example, if the security system 100 detects that the person is a senior using the camera module 322 or identifies the person using the camera module 322 and determines that they are a senior, the security system 100 may trigger an alarm to notify the senior's caregivers, may send a notification to the senior's caregivers or call them with an automated message, and/or may send a notification to one or more of the senior's family members or call them with an automated message.

The camera module 322 can be used by the security system 100 shown in FIG. 1 to detect certain conditions such as lighting conditions within a property. The security system 100, or the module itself, may take one or more actions in response to the detection of particular conditions within the property. For example, the camera module 322 may detect a low light condition and, in response, may send a signal to the control unit 102 shown in FIG. 1 or to one or more lighting modules indicating that low light condition has been detected. In response, the one or more lighting modules may automatically turn on their lights and/or the control unit 102 may instruct one or more lighting modules or one or more other lights within the property to turn on.

The motion detector module 324 may include an ultrasound emitter and receiver, IR sensors, microwave emitter and receiver, or other light sensors. The motion detector module 324 may be able to communicate with a security system (e.g., the security system 100 as shown in FIG. 1) through PLC and/or through wireless capabilities (Wi-Fi, Bluetooth, Cellular, etc.). The motion detector module 324 may additionally include one or more image sensors, such as one or more onboard cameras (e.g., a visible light camera) and/or one or more passive infra-red (PIR) detectors.

The motion detector module 324 can be used by the security system 100 shown in FIG. 1 to detect the motion of people or animals, e.g. pets, within a property. The security system 100, or the module itself, may take one or more actions in response to the detection of motion within the property. For example, if the security system 100 determines that no occupants or pets are located at a property (or are not expected to be located at the property) and motion is detected within the property using the motion detector module 324, the security system 100, or the module itself, may trigger an alarm, a notification being sent to the occupants of the property, a notification being sent to a monitoring service remote of the property, etc. When the motion detector module 324 also includes one or more onboard image sensors, it may perform additional actions such as those described above with respect to the camera module 322. For example, the motion detector module 324 may start streaming video data captured through its one or more onboard cameras (e.g., through the power-line network 110 shown in FIG. 1), or may capture and send one or more images (e.g., using the power-line network 110 shown in FIG. 1, or using a wireless network) in response to a triggering event (e.g., detecting motion, detecting or receiving an indication that a security panel has been disarmed, receiving a command from a user through the power-line network 110 shown in FIG. 1, receiving a command from a user through a wireless network, etc.)

The motion detector module 324 may be placed at particular locations and used by, for example, the security system 100 shown in FIG. 1 to perform a particular action when motion is detected based on at least the location of the motion detector module 324. For example, the motion detector module 324 may be used to detect senior wandering. In this example, the motion detector module 324 may be placed outside of the room of a senior who is at risk of wandering such that the motion detector module 324 detects if the door is opened, if someone walks through the door, etc. Based on the location of the motion detector module 324 being outside the door of a senior who has a risk of wandering—and potentially based on other factors such as a time of day—the security system 100 may trigger an alarm to notify the senior's caregivers, may send a notification to the senior's caregivers or call them with an automated message, and/or may send a notification to one or more of the senior's family members or call them with an automated message when the motion detector module 324 detects motion.

Other smart or active modules may include, for example, a router module, a cellular module, a thermostat module, a thermal sensor module, a Bluetooth module having a Bluetooth transmitter and receiver, a speaker module, a microphone module, a combination microphone and speaker module, a lighting module (e.g., having one or more light-emitting diodes), a strobe module, a cellular extender module (e.g., a Z-Wave network module), a temperature module, a carbon monoxide module, an extreme heat module, a smoke detector module, a lighting changes module (e.g.

having one or more light sensors), a vibration module, an air quality module, a home radar module, and/or a network based presence module or other device detection module. Each of these additional modules may be insertable into a modular cell, such as the modular cell 200 shown in FIGS. 2A and 2C-2D. Each of these additional modules may be able to communicate with a security system, e.g., the security system 100 as shown in FIG. 1, through PLC and/or through wireless capabilities (Wi-Fi, Bluetooth, Cellular, etc.).

A router module may allow for connecting to the internet without the need of, for example, a separate modem. For example, an internet service provider (ISP) may be able to provide internet connectivity to a property through use of a single router module. In this example, the router module may have a coax port, an RJ11 jack, fiber optic port, etc. that can receive an inbound connection from the ISP. Once the router module receives the inbound connection, it provides direct internet access to the PLC network of the property.

A cellular module may include a cell radio and be used to provide internet access to a property without the need of, for example, a modem or a wired, inbound connection. The cellular module may be able to connect to an internet connection, e.g. a broadband internet connection, through a cellular network. Through this connection, the cellular module may be able to provide internet access to the PLC network of the property.

A temperature module may include one or more temperature sensors, such as a thermometer. The temperature module may be used, e.g. by the security system 100 shown in FIG. 1, for HVAC control. For example, the temperature module may be used to determine when the temperature of a property or an area of the property has reached a certain temperature. In this example, when the security system 100 determines that the temperature is reached using the temperature module, the security system 100, e.g. the control unit 102 of the security system 100, may turn the AC on, turn the AC off, turn the heat on, turn the heat off, turn the AC off and the heat on, or turn the heat off and the AC on. The temperature module may be used, e.g. by the security system 100, for the detection of persons within a property. For example, the security system 100 may determine that a person is present in a particular area of a property when the temperature module detects a slight increase in temperature. The security system 100 may confirm the presence of the person with one or more other sensors or equipment, e.g. a camera. The temperature module may be used, e.g. by the security system 100, for remote monitoring.

A microphone module, speaker module, or microphone and speaker combination module may be used, e.g. by the security system 100 shown in FIG. 1, for a variety of functions. For example, a speaker module or microphone and speaker combination module may be used for home entertainment to function as a sound system. As another example, the microphone or microphone and speaker combination module may be used for sound analytics. In this example, the security system 100 may use the sound detected by the module to determine that a loud sound occurred, e.g. a sound that met a set decibel threshold, or to determine that a particular sound occurred, e.g. the detected sound matches the sound made by a person falling, glass breaking (which may indicate a break in), an emergency siren, a police siren, etc. The security system 100 may perform a function based on the loudness and/or source of the detected sound. For example, the security system 100 may send a notification to the property owners or occupants when a loud sound is detected, when glass break is detected, when a siren is detected, etc. The notification may indicate that a loud sound was detected, that glass break was detected, that a siren was detected, etc. Similarly, the microphone module or the microphone and speaker combination module may be used for monitoring occupants of a property. For example, the microphone module or the microphone and speaker combination module may be used by a property owner as a baby monitor.

As another example, one or more microphone modules, speaker modules, and/or microphone and speaker combination modules may be used, e.g. by the security system 100 shown in FIG. 1, as an intercom system. For example, occupants of a property may be able to communicate with other occupants of the property by speaking into one of the modules. This voice of the speaking occupant may be output through the speakers of one or more other modules. As another examples, the one or more microphone modules, speaker modules, and/or microphone and speaker combination modules may be used for two-way voice (TWV) during emergency response. Such an emergency response may be triggered by an alarm signal that may have been set off by the security system 100 detecting an emergency situation or an occupant indicating an emergency situation, e.g. through a mobile device in communicate with the security system 100. During an emergency response situation, emergency personnel, e.g., emergency contractors, the police, 911 operators, the fire department, etc., may be able to communicate with the occupants of the property through the one or more microphone modules, speaker modules, and/or microphone and speaker combination modules.

A vibration module may be used, e.g. by the security system 100 shown in FIG. 1, for movement detection. The security system 100, or the module itself, may take one or more actions in response to the detection of movement within a property. For example, if the security system 100 determines that no occupants or pets are located at a property (or are not expected to be located at the property) and movement is detected within the property using the vibration module, the security system 100, or the module itself, may trigger an alarm, a notification being sent to the occupants of the property, a notification being sent to a monitoring service remote of the property, etc.

The vibration module may be placed at particular locations and used by, for example, the security system 100 shown in FIG. 1 to perform a particular action when movement is detected based on at least the location of the vibration module. For example, the vibration module may be used to detect senior wandering. In this example, the vibration module may be placed outside of the room of a senior who is at risk of wandering such that the vibration module can detect movement of the door opening, or detect movement of someone walking through the doorway. Based on the location of the vibration module being outside the door of a senior who has a risk of wandering—and potentially based on other factors such as a time of day—the security system 100 may trigger an alarm to notify the senior's caregivers, may send a notification to the senior's caregivers or call them with an automated message, and/or may send a notification to one or more of the senior's family members or call them with an automated message when the vibration module detects movement.

An air quality module may be used, e.g. by the security system 100 shown in FIG. 1, to detect pollutants in the air or for ozone detection. For example, if the air quality module detects pollutants in the air, the security system 100, or the module itself, may trigger an alarm on the property, a notification to be sent to the property's occupants, a call to be made to the property's occupants, etc.

A home radar module may be used, e.g. by the security system 100 shown in FIG. 1, for motion detection. The home radar module may provide radio frequency based motion detection. The home radar module may be used for security and wellness applications. For example, the home radar may be used for person detection, for break in detection, for senior wandering, etc. in a manner similar to that described above with respect to the motion detector module 324 and the vibration module.

Various modules may be used together in conjunction or in a supplemental manner, e.g. to form a particular system or a particular subsystem. For example, the air quality module may be used in conjunction with one or more speaker modules such that if a pollutant is detected, an alarm can be outputted through the speakers of the speaker modules.

FIG. 3C depicts an example side view of a module 330. As shown, the module 330 includes an upper tab 332 and a lower tab 334. The upper tab 332 may be designed to fit into the cavity 213*a* or the cavity 215*a* of the modular slots 202 and 204 (as shown in FIG. 2D), respectively. The lower tab 334 may be designed to fit into the cavity 213*b* or the cavity 215*b* of the modular slots 202 and 204 (as shown in FIG. 2D), respectively. Together, the upper tab 332 and the lower tab 334 help to secure the module 330 into a modular slot, such as the modular slot 202 or the modular slot 204.

FIG. 3D depicts example rear views of different module configurations. For example, the back of a first module 340*a* may include six openings (e.g., sockets). Each of the six openings may be designed to receive a pin from a modular slot (e.g., the modular slots 202 and 204 as shown in FIGS. 2A and 2C-2D, or the modular slot 260*a* of FIG. 2E) when the module 340*a* is inserted into a modular slot. As another example, the back of a second module 340*b* may include nine openings (e.g., sockets). Each of the nine openings may be designed to receive a pin from a modular slot (e.g., the modular slot 260*b* shown in FIG. 2F) when the module 340*b* is inserted into a modular slot. Similarly, the back of a third module 340*c* may include twelve openings (e.g., sockets). Each of the twelve openings may be designed to receive a pin from a modular slot (e.g., the modular slot 260*c* shown in FIG. 2G) when the module 340*c* is inserted into a modular slot.

Each of the modules 340*a*-340*c* may include a first opening (e.g., socket) 364 and a second opening (e.g., socket) 366. The first opening 364 may be a dedicated power socket (e.g., for all modules that require power to be drawn). As an example, the first opening 364 of the module 340*a* may receive the pin 264 of the modular slot 260*a* when the module 340*a* is inserted into the modular slot 260*a*. The second opening 364 may be a dedicated ground socket (e.g., for all modules that require ground). As an example, the second opening 366 of the module 340*b* may receive the pin 266 of the modular slot 260*b* when the module 340*b* is inserted into the modular slot 260*b*.

The modules 340*a*-340*c* may be capable of being functionally insertable into modular slots that include more pins than the modules 340*a*-340*c* have openings for. For example, the module 340*a* may be capable of being inserted into the modular slot 260*b* shown in FIG. 2F. Here, the openings (e.g., sockets) of the module 340*a* would receive only the pins in the first row of pins 262*a* and the second row of pins 262*b*. Accordingly, no electrical contact would be made between the module 340*a* and the pins in the third row of pins 262*c*. Similarly, the module 340*a* may be capable of being inserted into the modular slot 260*c* shown in FIG. 2G.

Here, the openings (e.g., sockets) of the module 340*a* would receive only the pins in the first row of pins 262*a* and the second row of pins 262*b*. Accordingly, no electrical contact would be made between the module 340*a* and the pins in the third row of pins 262*c* and in the fourth row of pins 262*d*.

In some cases, instead of openings (e.g., sockets), the modules 340*a*-340*c* include pins. These pins may be inserted into corresponding sockets of a modular slot when the module is inserted into the modular slot of a modular cell. Similarly, these pins may contact corresponding contact pads of a modular slot, e.g., when the pins are spring-loaded pins.

In some cases, instead of openings (e.g., sockets), the modules 340*a*-340*c* include contact pads. These contact pads may be made from, for example, copper that are embedded in silicone (e.g., of a circuit board of the module) and/or plastic (e.g., of an exterior housing of the module). These contact pads may contact corresponding pins (e.g., spring-loaded pins) of a modular slot when the module is inserted into the modular slot.

In some cases, a module may have a different socket/contact pad/pin configuration. For example, a module may include a single row of sockets/contact pads/pins. As another example, a module may include only one or two sockets/contact pads/pins.

As another example, a module may include sockets/contact pads/pins that are arranged vertically instead of horizontally (e.g., such that the longer edge of each of the sockets/contact pads/pins is aligned vertically instead of horizontally).

As another example, a module may include sockets/contact pads/pins that are arranged in patterns other than rows. For example, the sockets/contact pads/pins for a module may be arranged diagonally. As another example, a module may include one or more sockets/contact pads/pins in each corner of a back face of the module.

Figure 4A:
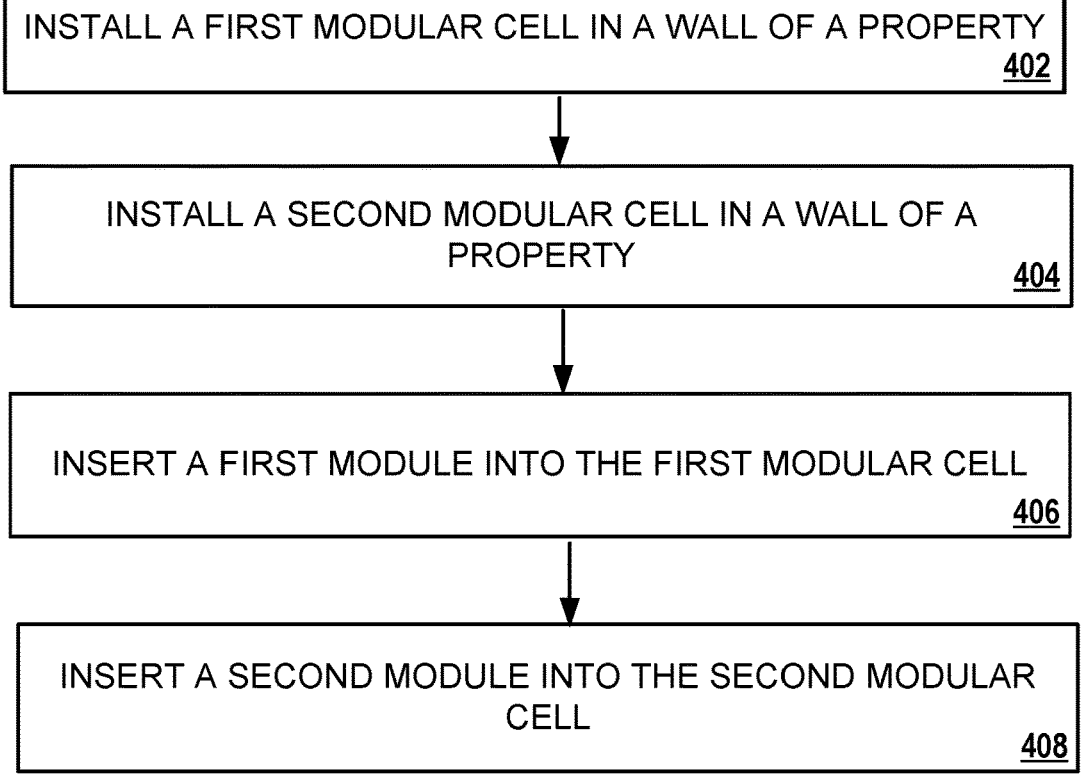
FIG. 4A is a flow diagram illustrating an example process for installing a modular electrical grid communications platform.

FIG. 4A is a flowchart of an example process 400A for installing a modular electrical grid communications platform.

The process 400A includes installing a first modular cell in a wall of a property (402). For example, the first modular cell may be the modular cell 112, the modular cell 114, or the modular cell 116 as shown in FIG. 1. The first modular cell may have PLC capabilities as shown, for example, in FIG. 2D. As an example, the first modular cell may be the modular cell 112 connected to the local power-line network 110 as shown in FIG. 1. The modular cell may be installed in place of, for example, a power outlet or a switch (e.g., light switch).

The process 400A includes installing a second modular cell in a wall of a property (404). For example, the second modular cell may be the modular cell 112, the modular cell 114, or the modular cell 116 as shown in FIG. 1. The second modular cell may have PLC capabilities as shown, for example, in FIG. 2D. As an example, the second modular cell may be the modular cell 116 connected to the local power-line network 110 as shown in FIG. 1. The second modular cell may be installed in place of, for example, a power outlet or a switch (e.g., light switch).

The process 400A includes inserting a first module into the first modular cell (406). For example, the first module may be the camera module 120, the motion detector module 122, the Wi-Fi access point module 124, the power module 126*a*, the power module 126*b*, or the Ethernet module 128 as shown in FIG. 1. The first module may be able to communicate with the other modules and/or the control unit 102 of the security system 100 by using the local power-line network 110 and/or through wireless capabilities. As an example, the first module may be the motion detector module 122 that is able to communicate with other modules and/or the control unit 102 by using the local power-line network 110 as shown in FIG. 1.

The process 400A includes inserting a second module into the second modular cell (408). For example, the second module may be the camera module 120, the motion detector module 122, the Wi-Fi access point module 124, the power module 126a, the power module 126b, or the Ethernet module 128 as shown in FIG. 1. The second module may be able to communicate with the other modules and/or the control unit 102 of the security system 100 by using the local power-line network 110 and/or through wireless capabilities. As an example, the second module may be the Ethernet module 128 that is able to communicate with other modules through the local power-line network 110, and is able to communicate with the control unit 102 through the router 108 and the local network 130 as shown in FIG. 1.

In some implementations, the process 400A includes inserting a "blank" module into the first modular cell and/or the second modular cell. As an example, the first modular cell and the second modular cell may each contain two slots, e.g. the modular slots 202 and 204 shown in FIG. 2A. The blank module(s) may cover up a slot of the first module and/or the second module. Each blank module may be removable such as to allow a module to be inserted into the corresponding slot at a later time.

In some implementations, the process 400A includes installations of one or more additional modular cells, and the insertion of one or more additional modules.

Figure 4B:
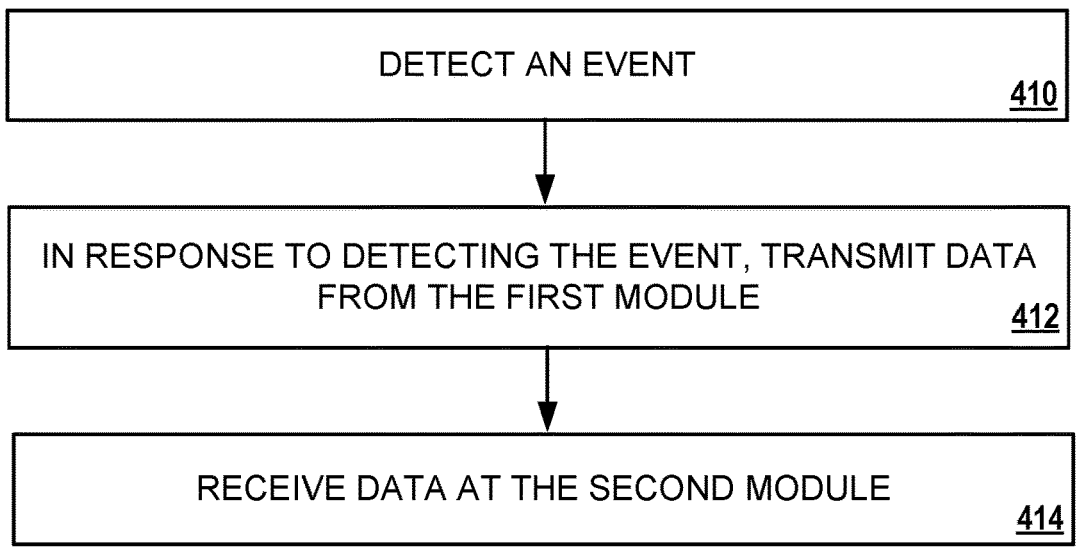
FIG. 4B is a flow diagram illustrating an example process for using a modular electrical grid communications platform.

FIG. 4B is a flowchart of an example process 400B for using a modular electrical grid communications platform. The process 400B can be performed, at least in part, using the security system 100 described in FIG. 1. For example, the process 400B may be performed by two or more installed modules and their one or more corresponding modular cells. Alternatively, the process 400B might be performed by a combination of two or more modules, their corresponding one or more modular cells, and the control unit 102. Alternatively, the process 400B might be performed by a combination of two or more modules, their corresponding one or more modular cells, the control unit 102, and the monitoring server 150. One or more operations of the process 400B may be performed by or initiated by the control unit 102. Similarly, the process 400B can be performed, at least in part, using the home monitoring system 600 described in FIG. 6. For example, one or more of the operations of the process may be performed by the control unit 610, the mobile device 640, and/or the integrated security I/O devices 680.

The process 400B may be performed after the process 400A has been performed. That is, the process 400A for using the modular grid communications platform may be performed after the installation of the platform is complete.

The process 400B includes detecting an event (410). The event may be receiving input data at a module. For example, if the module is an HDMI module, the corresponding modular cell may determine that an even has occurred as it receives data from the modular cell. The event may include the triggering of a sensor of a module, or the collection of sensor data indicating an event (e.g., an environmental change). For example, with respect to FIG. 1, an event may be detected if the motion detector module 122 detects movement, e.g., by the motion detector module 122 or by the control unit 102 after receiving data from the motion detector module 122 indicating movement. Additionally or alternatively, the event may be determining that certain conditions are met. For example, an event might only be detected, if the motion detector module 122 detects motion, and either the current time is between 12:00 am and 7:00 am or the occupants of the property 160 are away from the property 160. As another example, an event may be detected if a current time is within a pre-programmed time period (e.g., of a schedule set by an occupant of the property 160 or set by a smart device such as a smart thermostat of the property 160). For example, the modules themselves may be programed to begin collecting sensor data between 8:00 am and 4:00 pm. Alternatively, the control unit 102, in response to determining that the current time is between 8:00 am and 4:00 pm, may send instructions to various modules over the power-line network 110 to start collecting sensor data.

In some cases, the event is not detected by a module. For example, with respect to FIG. 1, the control unit 102 may detect an event (e.g., using data from sensors and/or other equipment installed at the property 160). The control unit 102 may detect an event in response to a window or door sensor being triggered. The control unit 102 may then proceed to send instructions to activate (e.g., turn on) one or more modules, and/or instructions for the modules to start collecting sensor data (e.g., images). As another example, the monitoring server 150 may detect an event. The monitoring server 150 may then notify the control unit 102, which, in turn, may generate and send instructions to one or more modules.

Various other events are possible. For example, an event may be detected by a module that includes a light sensor if an observed light level meets a threshold light level (e.g., data collection may be triggered in response to detecting a light level that corresponds to daylight, or detecting a light level that corresponds to dusk). As another example, an event may be detected if an on (as opposed to off) time of an electrical device (e.g., an amount of time that the electronic device is in an ON state, is drawing more than a threshold level of current, and/or is transmitting data) connected to a module inserted in a modular cell—or through another module inserted in a different modular cell—meets a threshold elapsed time (e.g., a previously activated module may stop collecting image data after fifteen minutes have elapsed and no other events are detected). Similarly, an event may be detected if an energy usage of an electrical device connected to a module inserted in a modular cell meets a threshold energy usage (e.g., the energy drawn by a lamp connected to power outlet module meets an allocated amount of energy). As another example, an event may include the detection of a window/door in an area of a property where a modular cell is installed being opened or broken.

As an example, if an on time for a particular module, modular cell, and/or module and modular cell combination is set to two hours, then the inserted module and/or modular cell may automatically cut off power and/or prevent data flow between the module and an electronic device connected to the module after two hours has elapsed since the electronic device has been turned on and/or after two hours of data flow has occurred. Specifically, the module may be a power outlet module inserted into a modular cell. The electronic device may be, for example, a lamp connected to the power outlet module. In response to detecting that a threshold level of current is being drawn from a backplane of the module cell (e.g., as a result of the lamp being turned on), the power outlet module and/or the modular cell may start a timer. When the elapsed time meets a predetermined threshold amount of time (e.g., set by an occupant of the property 160), the power outlet module and/or the modular cell may cut off power to the lamp.

Events may correspond to a state of the security system, the location of occupants, and/or the behavior of occupants. As another example, an event may be detected if a security system of a property where a modular cell is installed is placed in an armed state (e.g., the control unit 102 is placed in an armed state by an occupant of the property 160). As another example, an event may be detected if an alarm of a security system of a property where a modular cell is installed has been triggered (e.g., control unit 102 may trigger alarm based on data from the motion detector 122 indicating motion has been detected while the occupants of the property 160 are away). As another example, an event may be detected if the occupants are determined to be away from the property.

Events may also correspond to particular network conditions. For example, an event may be detected if a monitored network capacity meets a threshold capacity. If this occurs, then instructions may be sent to the Wi-Fi access point module 124 to deactivate it in an effort to reduce the number of persons using the local network 130, or to prevent persons in a certain area of the property 160 from accessing the network (e.g., the Wi-Fi access point module 124 may be setup in the children's room and the children may rely on the Wi-Fi access point module 124 for access to the local network 130). As another example, an event may be detected if a monitored network download/upload speed meets a threshold download/upload speed (e.g., based on the data collected by the Wi-Fi access point module 124). As another example, an event may be detected (e.g., using data from the Wi-Fi access point module 124) if a particular user device is detected as joining a network of a property where a modular cell is installed.

The process 400B includes transmitting data from the first module in response to detecting the event (412). For example, in response to detecting motion, the motion detector module 122 may transmit data indicating that motion has been detected (e.g., by the person 170 coming through the window 168 of the property 160) over the local power-line network 110 as shown in FIG. 1. The data may be transmitted to a particular device. For example, the data indicating that motion has been detected may be transmitted to the control unit 102 through the local power-line network 110 and the local network 130, and/or to the camera module 120 (e.g., using the PLC circuit in the modular cell 112).

The process 400B includes receiving data at the second module (414). For example, the Ethernet module 128 may receive the data from the motion detector module 122 indicating that motion has been detected. In this example, the data may be received by the Ethernet module 128 over the local power-line network 110 as shown in FIG. 1. The data may then be transmitted to the Wi-Fi Router 108 to the control unit 102. As another example, the camera module 120 may receive the data from the motion detector module 122 (or data indicating that motion was detected) from the circuit board of the modular cell 112, and, in response, start collecting images.

In some cases, the second module performs one or more actions in response to receiving the data. For example, the module may activate an onboard sensor (e.g., motion sensor, visible-light camera, infrared-light camera, strobe light, an audible alarm using a speaker, etc.) in response to receiving the data.

FIG. 5 is a flow diagram illustrating an example process 500 for integrating a modular electrical grid communications platform with a security system. The process 500 can be performed, at least in part, using the security system 100 described in FIG. 1 or the home monitoring system 600 described in FIG. 6.

The process 500 includes obtaining sensor data from one or more sensors located at a property (502). For example, the sensor data may include data from the sensors 106, the equipment 104, the camera module 120, or the motion detector module 122 as shown in FIG. 1. In this example, the property may be the property 160 as shown in FIG. 1. In this example, the control unit 102 may receive the sensor data through the local network 130, through a wired connection (e.g., an Ethernet connection, a USB connection, etc.), through a combination of the local network 130 and the local power-line network 110, and/or through a combination of the local power-line network 110 and a wired connection. In some implementations, the control unit 102 sends the sensor data to the monitoring server 150 as shown in FIG. 1, or the monitoring server 150 may directly receive the sensor data from the sensors 106, the equipment 104, the camera module 120, or the motion detector module 122.

The process 500 optionally includes where the sensor data includes data from a first module inserted in a modular cell installed on the property (504). For example, the sensor data may include data from the camera module 120 or the motion detector module 122 inserted into the modular cell 112 as shown in FIG. 1.

The process 500 includes analyzing the sensor data (506). For example, with respect to FIG. 1, the control unit 102 may determine that data transmitted by the motion detector module 122 indicates that motion has been detected in the first room 162 of the property 160.

The process 500 includes, based on analyzing the sensor data, determining one or more operations (508). For example, with respect to FIG. 1, the control unit 102 (or, in some implementations, the monitoring server 150) may determine based on, for example, the time of day that the motion is detected, the time of year that the motion is detected, the arming state of the security system, and/or the patterns of the occupants of the property 160 (e.g., rarely going into the first room 162) one or more operations. In this example, the one or more operations may depend on a level of suspicion that the control unit 102 assigns to the received sensor data. In this example, the level of suspicious may be somewhat suspicious, moderately suspicious, or highly suspicious. The one or more operations may include, for example, sending a notification to an occupant of the property 160, sending a notification to the monitoring server 150, calling or otherwise notifying the police, sending instructions to the camera module 120 to start recording and transmitting data back to the control unit 102, the monitoring server 150, and/or the occupant.

The process 500 optionally includes sending instructions to a module inserted in a modular cell installed on the property to perform an operation of the one or more operations (510). For example, with respect to in FIG. 1, the control unit 102 may send instructions to the camera module 120 to start recording camera data from the first room 162 and to transmit that data back to the control unit 102, the monitoring server 150, and/or an occupant device.

Figure 6:
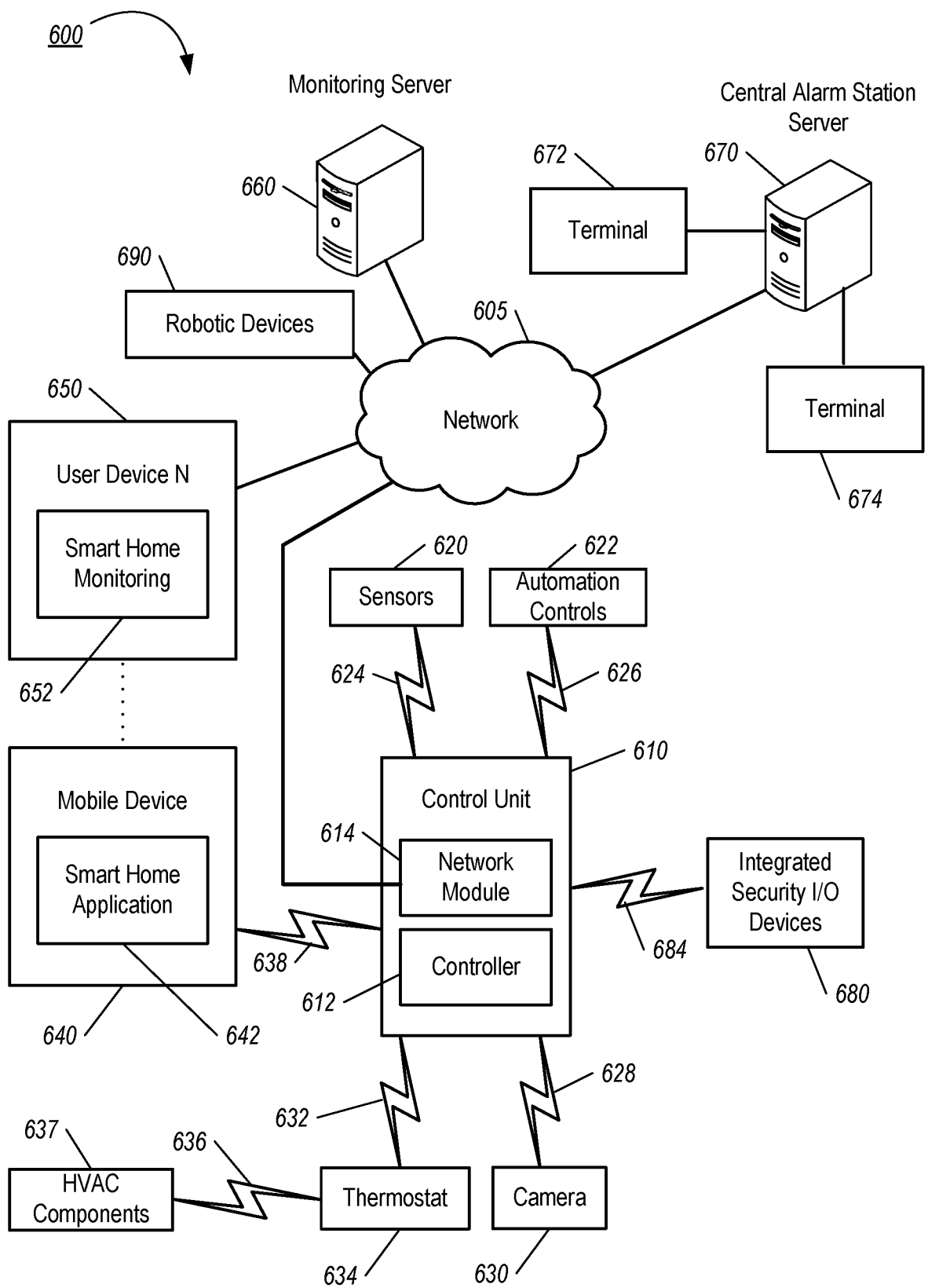
FIG. 6 is a block diagram illustrating an example security monitoring system.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network. The network 605 may be a local network and include, for example, 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The network 605 may be a mesh network constructed based on the devices connected to the mesh network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680. Additionally, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600 (e.g., user 108). For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), other Powerline networks that operate over AC wiring, or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

It is claimed that:

1. A device comprising:
    a housing that forms an interior space, and that includes (i) an exterior surface, (ii) one or more pass-through regions that each define a through-hole between the interior space and the exterior surface, and (iii) a recess at the exterior surface that is capable of receiving a module that includes at least one sensor and is adapted to be placed in and removed from the recess;
    a printed circuit board disposed within the interior space of the housing, wherein the printed circuit board comprises (i) a powerline backplane configured to distribute data and power and (ii) electrical components that are coupled to the powerline backplane; and
    electrical connections that each have (i) a first end connected to the printed circuit board, and (ii) a second end that directly or indirectly contacts a corresponding component of the module, the electrical connections being capable of electrically coupling the module to the printed circuit board, wherein the first ends of the electrical connections are electrically coupled to corresponding data or power components of the electrical components through the powerline backplane.

2. The device of claim 1, wherein the housing includes a second recess at the exterior surface that is capable of receiving a second module, and
    the device comprises the second module placed in the second recess, wherein the second module includes one or more components that include at least one component different from a component of the module.

3. The device of claim 1, wherein the second ends of the electrical connections are located in the one or more pass-through regions.

4. The device of claim 1, wherein:
    the module includes multiple receptacles; and
    the second ends of the electrical connections form prongs or are connected to prongs that enter corresponding receptacles of the module.

5. The device of claim 1, wherein:
    the module includes multiple prongs; and
    the second ends of the electrical connections form receptacles or are connected to receptacles that receive corresponding prongs of the module.

6. The device of claim 1, comprising one or more locking mechanisms to secure the module in the recess at the exterior surface.

7. The device of claim 6, wherein the housing includes:
a first pass-through region that defines a through-hole between the exterior surface and a first portion of the recess that defines a first cavity, wherein the first cavity is capable of receiving a first tab of the module;
a second pass-through region that defines a through-hole between the exterior surface and a second portion of the recess that defines a second cavity, wherein the second cavity is capable of receiving a second tab of the module; and
wherein the first cavity, the first tab, the second cavity, and the second tab together form a locking mechanism of the one or more locking mechanisms.

8. The device of claim 6, comprising a faceplate that is secured to the exterior surface after the module is placed in the recess and that prevents the module from being removed, wherein the faceplate is a locking mechanism of the one or more locking mechanisms.

9. The device of claim 1, comprising a connector housing that includes multiple pins or sockets,
wherein the connector housing is mounted in the recess, and
wherein the second ends of the electrical connections are coupled to the connector housing.

10. The device of claim 9, wherein:
the connector housing includes multiple pins that are spring-loaded, and
the connector housing and the multiple spring-loaded pins are configured to require that all of the multiple spring-loaded pins be pressed at substantially the same time to:
allow movement of the multiple spring-loaded pins; and
to electrically couple the module to the printed circuit board.

11. The device of claim 1, wherein the module is configured to perform one or more of the following operations in response to receiving a signal:
instruct a sensor of the at least one sensor to collect data;
instruct a sensor of the at least one sensor to stop collecting data;
to turn on; and
to turn off.

12. The device of claim 11, wherein the signal is a signal generated in response to one or more conditions being met and the conditions include one or more of the following:
a current time matches a predetermined time or is in a predetermined time range of a set schedule;
movement has been detected in a property or a particular area of the property where the device has been installed;
a current light level meets a threshold light level;
an on time of an electrical device connected to the device through the module or through another module meets a threshold on time, wherein the on time represents an amount of time that the electrical device is turned on or an amount of time that the electrical device is transmitting data;
an amount of energy that has been output through the module or through another module meets a threshold energy usage;
a security system of a property where the device is installed is placed in an armed state;
an alarm of a security system of a property where the device is installed has been triggered;
a window in an area of a property where the device is installed has been opened or broken;
a door in an area of a property where the device is installed has been opened;
a detected network capacity meets a threshold capacity;
a detected network download speed meets a threshold download speed;
a detected network upload speed meets a threshold upload speed;
a particular user device is detected as joining a network of a property where the device is installed; or
an occupant of the property where the device is installed is determined to be away from the property.

13. The device of claim 11, wherein the signal is a signal generated by an external device and is received at the printed circuit board over a wired connection or a wireless connection.

14. The device of claim 13, wherein the wired connection is an electrical connection between the printed circuit board and one or more power lines of a property where the device is installed.

15. The device of claim 13, wherein the external device is installed in a property.

16. The device of claim 11, wherein the signal is generated in response to sensor data collected by the module using the at least one sensor.

17. The device of claim 11, wherein the module is a camera module and the sensor is a camera capable of collecting image data, a motion detector module and the sensor is motion sensor capable of sensing motion in an area of a property where the device is installed, a smart power outlet module that is capable of tracking energy usage and/or preventing power from being drawn when turned off, or a Wi-Fi module that includes a wireless transceiver and is capable of extending a Wi-Fi network of a property where the device is installed, detecting download and upload speeds of the Wi-Fi network, and/or detecting devices connected to the Wi-Fi network.

18. The device of claim 11, wherein the housing includes a second recess at the exterior surface that is capable of receiving a second module, and
the device comprises the second module placed in the second recess, wherein the second module is a power outlet module that includes a power outlet and that is capable of transmitting power between one or more power lines of a property where the device is installed and an electronic device connected to the second module, an Ethernet module that includes an Ethernet port and that is capable of transferring data, a USB module that includes a USB port and that is capable of transferring data, an HDMI module that includes an HDMI port and that is capable of transferring data, a coaxial cable module that includes a coaxial port and that is capable of transferring data, an infrared-light module that includes an infrared-light port and that is capable of transferring data, a camera module and the sensor is a camera capable of collecting image data, a motion detector module and the sensor is motion sensor capable of sensing motion in an area of a property where the device is installed, a smart power outlet module that is capable of tracking energy usage and/or preventing power from being drawn when turned off, or a Wi-Fi module that includes a wireless transceiver and is capable of extending a Wi-Fi network of a property where the device is installed, detecting download and upload speeds of the Wi-Fi network, and/or detecting devices connected to the Wi-Fi network.

19. A device comprising:

a housing that forms an interior space, and that includes (i) an exterior surface, (ii) one or more pass-through regions that each define a through-hole between the interior space and the exterior surface, and (iii) a recess at the exterior surface that is capable of receiving a module that includes at least one sensor and is adapted to be placed in and removed from the recess, wherein the module is configured to perform one or more operations in response to receiving a signal, the signal generated in response to one or more conditions that include one or more of the following:

a current time matches a predetermined time or is in a predetermined time range of a set schedule;

movement has been detected in a property or a particular area of the property where the device has been installed;

a current light level meets a threshold light level;

an on time of an electrical device connected to the device through the module or through another module meets a threshold on time, wherein the on time represents an amount of time that the electrical device is turned on or an amount of time that the electrical device is transmitting data;

an amount of energy that has been output through the module or through another module meets a threshold energy usage;

a security system of a property where the device is installed is placed in an armed state;

an alarm of a security system of a property where the device is installed has been triggered;

a window in an area of a property where the device is installed has been opened or broken;

a door in an area of a property where the device is installed has been opened;

a detected network capacity meets a threshold capacity;

a detected network download speed meets a threshold download speed;

a detected network upload speed meets a threshold upload speed;

a particular user device is detected as joining a network of a property where the device is installed; or an occupant of the property where the device is installed is determined to be away from the property;

a printed circuit board disposed within the interior space of the housing; and electrical connections that each have (i) a first end connected to the printed circuit board, and (ii) a second end that directly or indirectly contacts a corresponding component of the module, the electrical connections being capable of electrically coupling the module to the printed circuit board.

* * * * *